US012360832B2

(12) United States Patent
Smeltzer et al.

(10) Patent No.: US 12,360,832 B2
(45) Date of Patent: Jul. 15, 2025

(54) ENTITY RELATIONSHIPS AND VERSIONING

(71) Applicant: DexCare, Inc., Seattle, WA (US)

(72) Inventors: Kenton Lamar Smeltzer, Summerland Key, FL (US); Michael Angel Cruz, Stock Island, FL (US); William Tomer, Bainbridge Island, WA (US); Chad Garrett Waldman, Kirkland, WA (US); Clare Rene Mason, Seattle, WA (US)

(73) Assignee: DexCare, Inc., Seattle, WA (US)

( * ) Notice: Subject to any disclaimer, the term of this patent is extended or adjusted under 35 U.S.C. 154(b) by 0 days.

(21) Appl. No.: 18/804,618

(22) Filed: Aug. 14, 2024

(65) Prior Publication Data

US 2025/0103405 A1 Mar. 27, 2025

Related U.S. Application Data

(60) Provisional application No. 63/539,960, filed on Sep. 22, 2023.

(51) Int. Cl.
  *G06F 9/54* (2006.01)
  *G06F 16/21* (2019.01)
  *G06F 16/28* (2019.01)

(52) U.S. Cl.
  CPC ............ *G06F 9/546* (2013.01); *G06F 16/212* (2019.01); *G06F 16/288* (2019.01)

(58) Field of Classification Search
  CPC ....... G06F 9/546; G06F 16/212; G06F 16/288
  (Continued)

(56) References Cited

U.S. PATENT DOCUMENTS

| | | | |
|---|---|---|---|
| 7,082,502 B2 * | 7/2006 | Najam | H04L 49/103 709/213 |
| 7,383,285 B1 * | 6/2008 | Pal | G06F 16/289 |

(Continued)

FOREIGN PATENT DOCUMENTS

| | | |
|---|---|---|
| CN | 113923441 A | 1/2022 |
| JP | 2016-167676 A | 9/2016 |

(Continued)

OTHER PUBLICATIONS

Madine et al, "Fully Decentralized Multi-Party Consent Management for Secure Sharing of Patient Health Records", IEEE, pp. 1-15 (Year: 2020).*

(Continued)

*Primary Examiner* — Anil Khatri
(74) *Attorney, Agent, or Firm* — John W. Branch; Branch Partners PLLC

(57) ABSTRACT

Embodiments are directed to managing data. An application may request to instantiate an entity. A schema for the entity may be determined based on an entity version. Foreign properties of the entity may be determined based on the schema. Relationships between the entity and foreign entities may be determined based on an entity relationship table such that each relationship may associate foreign entity identifiers with the foreign properties. A native object for a native environment of the application may be generated based on the schema, the entity and the foreign entities such that the native object may include members that may correspond to the foreign entities. Data associated with the entity and the foreign entities may be provided to the application based on the native object. Changes to the data by other applications may be employed to update the native object to include the changed data.

24 Claims, 15 Drawing Sheets

(58) Field of Classification Search
USPC .................................................. 717/102–121
See application file for complete search history.

(56) References Cited

U.S. PATENT DOCUMENTS

| | | | |
|---|---|---|---|
| 7,617,223 B1* | 11/2009 | Devanathan | G06F 16/258 |
| 8,145,726 B1 | 3/2012 | Roche et al. | |
| 8,806,431 B1* | 8/2014 | Colton | G06F 8/316 |
| | | | 717/114 |
| 9,372,731 B1 | 6/2016 | Marr et al. | |
| 9,380,268 B2 | 6/2016 | Weber et al. | |
| 9,402,054 B2 | 7/2016 | Aaron et al. | |
| 9,497,412 B1 | 11/2016 | Rosenberg | |
| 9,565,246 B1* | 2/2017 | Tsypliaev | G06Q 10/107 |
| 10,055,450 B1* | 8/2018 | Tansel | G06F 16/2477 |
| 10,223,150 B2* | 3/2019 | Livshits | G06F 11/14 |
| 10,452,645 B2* | 10/2019 | Watson | G06F 16/258 |
| 10,545,950 B2* | 1/2020 | Collins | G06F 16/211 |
| 11,138,164 B1* | 10/2021 | Munuhur Rajagopal | |
| | | | G06F 16/213 |
| 11,416,798 B2* | 8/2022 | Brannon | G06F 21/577 |
| 11,595,221 B1 | 2/2023 | Wlodarczyk et al. | |
| 11,636,086 B1* | 4/2023 | Goodnow | G06F 16/288 |
| | | | 707/736 |
| 11,640,565 B1* | 5/2023 | Pfeiler | G06Q 10/0631 |
| | | | 705/7.12 |
| 11,641,385 B1 | 5/2023 | Ferry et al. | |
| 11,838,140 B2 | 12/2023 | Wlodarczyk et al. | |
| 11,854,708 B2 | 12/2023 | Streat et al. | |
| 11,930,060 B2 | 3/2024 | Ferry et al. | |
| 12,235,810 B2* | 2/2025 | Cao | G06F 3/0638 |
| 2004/0185785 A1 | 9/2004 | Mir et al. | |
| 2006/0271400 A1 | 11/2006 | Clements et al. | |
| 2014/0180715 A1 | 6/2014 | Phillips et al. | |
| 2014/0313282 A1 | 10/2014 | Ma et al. | |
| 2016/0308737 A1 | 10/2016 | Liu et al. | |
| 2017/0272485 A1 | 9/2017 | Gordon et al. | |
| 2019/0079786 A1 | 3/2019 | Shani et al. | |
| 2019/0122760 A1 | 4/2019 | Wang | |
| 2019/0333613 A1 | 10/2019 | Zaidi et al. | |
| 2020/0222813 A1 | 7/2020 | Baszucki | |
| 2020/0357494 A1 | 11/2020 | Kadri et al. | |
| 2021/0076001 A1 | 3/2021 | Periyannan et al. | |
| 2021/0314526 A1 | 10/2021 | Astarabadi et al. | |
| 2021/0319914 A1 | 10/2021 | Roh | |
| 2021/0358618 A1 | 11/2021 | Crocker | |
| 2021/0399911 A1 | 12/2021 | Jorasch et al. | |
| 2021/0400142 A1 | 12/2021 | Jorasch et al. | |
| 2021/0406841 A1 | 12/2021 | Chen et al. | |
| 2022/0165401 A1 | 5/2022 | Levitt | |
| 2022/0215970 A1 | 7/2022 | Trpkovski et al. | |
| 2023/0153740 A1 | 5/2023 | Meehan et al. | |
| 2023/0187086 A1 | 6/2023 | Streat et al. | |
| 2023/0291592 A1 | 9/2023 | Wlodarczyk et al. | |
| 2023/0403314 A1 | 12/2023 | Ferry et al. | |
| 2024/0120043 A1 | 4/2024 | Kaushal et al. | |

FOREIGN PATENT DOCUMENTS

| | | |
|---|---|---|
| WO | 2014/018012 A1 | 1/2014 |
| WO | 2016/019227 A1 | 2/2016 |
| WO | 2023/172390 A1 | 9/2023 |

OTHER PUBLICATIONS

Liu et al., "Automated Software Entity Matching Between Successive Versions", IEEE, pp. 1615-1627 (Year: 2023).*

Wang et al, "Method for Relation Extraction Based on Entity Boundary Features", ACM, pp. 1-6 (Year: 2024).*

Nie et al, "An entity relation extraction method based on the fusion of contextual information", ACM, pp. 1-6 (Year: 2023).*

Huang et al, "API Entity and Relation Joint Extraction from Text via Dynamic Prompt-tuned Language Model", ACM, pp. 1-25 (Year: 2023).*

Office Communication for U.S. Appl. No. 18/615,623 mailed Sep. 25, 2024, pp. 1-12.

International Preliminary Report on Patentability Chapter I for International Patent Application No. PCT/US2023/013531 mailed Sep. 26, 2024, pp. 1-5.

Office Communication for U.S. Appl. No. 17/551,084 mailed Nov. 1, 2023, pp. 1-22.

Office Communication for U.S. Appl. No. 17/837,218 mailed Mar. 9, 2023, pp. 1-7.

Office Communication for U.S. Appl. No. 17/837,218 mailed Mar. 15, 2023, pp. 1-2.

Office Communication for U.S. Appl. No. 18/114,916 mailed May 23, 2023, pp. 1-9.

Office Communication for U.S. Appl. No. 17/837,218 mailed Nov. 17, 2022, pp. 1-20.

Office Communication for U.S. Appl. No. 17/692,738 mailed Jan. 5, 2023, pp. 1-8.

Office Communication for U.S. Appl. No. 17/837,218 mailed Feb. 9, 2023, pp. 1-5.

Office Communication for U.S. Appl. No. 17/837,218 mailed Aug. 12, 2022, pp. 1-17.

Office Communication for U.S. Appl. No. 17/692,738 mailed Oct. 4, 2022, pp. 1-10.

Office Communication for U.S. Appl. No. 17/692,738 mailed Jun. 13, 2022, pp. 1-9.

Office Communication for U.S. Appl. No. 17/551,084 mailed May 23, 2023, pp. 1-6.

Office Communication for U.S. Appl. No. 17/551,084 mailed Sep. 16, 2022, pp. 1-4.

Office Communication for U.S. Appl. No. 17/551,084 mailed Jul. 1, 2022, pp. 1-59.

Office Communication for U.S. Appl. No. 18/114,916 mailed Sep. 19, 2023, pp. 1-7.

Office Communication for U.S. Appl. No. 17/551,084 mailed Jul. 13, 2023, pp. 1-28.

Office Communication for U.S. Appl. No. 17/551,084 mailed Nov. 15, 2022, pp. 1-61.

Office Communication for U.S. Appl. No. 17/551,084 mailed Mar. 6, 2023, pp. 1-26.

Office Communication for U.S. Appl. No. 18/130,660 mailed Sep. 28, 2023, pp. 1-19.

Office Communication for U.S. Appl. No. 18/130,660 mailed Dec. 14, 2023, pp. 1-4.

Office Communication for U.S. Appl. No. 18/130,660 mailed Jan. 11, 2024, pp. 1-7.

Office Communication for U.S. Appl. No. 18/130,660 mailed Jun. 14, 2023, pp. 1-16.

Office Communication for U.S. Appl. No. 17/551,084 mailed Mar. 14, 2022, pp. 1-52.

Office Communication for U.S. Appl. No. 18/615,623 mailed Jun. 21, 2024, pp. 1-12.

* cited by examiner

```
{
    "version": "1.1",  ← 802
    "title": "Patient",
    "description": "A patient",
    "type": "Patient",     ← 804
    "properties": { ← 806
        "id": {
            "description": "The unique identifier for a patient",
            "type": "integer" ← 808
        },
        "name": { ← 810
            "description": "Name of patient",
            "type": "string"
        },
        "visits": {
            "description": "Record of patient visits",
            "type": "object",
            "properties": {
                "televisit": {
                    "type": "array",
                    "items": {  ← 812
                        "description": "List of telehealth visits"
                        "type": "TeleHealthVisit", ← 814
                        "version": "1.0" ← 816
                    }
                },
                "in-person": {
                    "type": "array",
                    "items": { ← 818
                        "description": "List of in-person visits",
                        "type": "InPersonVisit", ← 820
                        "version": "1.0" ← 822
                    }
                }
            }
        },
        ...
    }
    ...
}
```

*Fig. 8*

```
{
    "version": "1.2", ← 902
    "description": "A patient",
    "type": "Patient", ← 904
    "properties": {
        "id": {
            "description": "The unique identifier for a patient",
            "type": "integer"
        },
        "name": {
            "description": "Name of patient",
            "type": "string"
        },
        "address": { ← 906
            "description": "Address information for patient",
            "type": "Address" ← 908
            "version": "1.0" ← 910
        "visits": {
            "description": "Record of patient visits",
            "type": "object",
            "properties": {
                "televisit": {
                    "type": "array",
                    "items": {
                        "description": "List of telehealth visits",
                        "type": "TeleHealthVisit"
                        "version": "1.0"
                    }
                },
                "in-person": {
                    "type": "array",
                    "items": {
                        "description": "List of in-person visits",
                        "type": "InPersonVisit"
                        "version": "1.0"
                    }
                }
            }
        },
        ...
    }
    ...
}
```

*Fig. 9*

ENTITY RELATIONSHIPS AND VERSIONING

CROSS-REFERENCE TO RELATED APPLICATION

This application is a Utility patent application based on previously filed U.S. Provisional Patent Application Ser. No. 63/539,960 filed on Sep. 22, 2023, the benefit of the filing date of which is hereby claimed under 35 U.S.C. § 119 (e), and the contents of which is further incorporated in entirety by reference.

TECHNICAL FIELD

The present invention relates generally to managing entities in distributed systems, and more particularly, but not exclusively, to entity relationships and versioning.

BACKGROUND

Providing healthcare services often require complex relationships between disparate stakeholders, including, patients, patient guardians, providers, provider organizations, third-party payors, or the like. In some case, providing effective service may require responsive communication among and between the various stakeholders. Further, provider organizations may expend significant resources managing the fluid communication or shared responsibilities among the various parties associated with providing healthcare services. In some cases, determining the service requirements for patients or allocating appropriate provider resources to meet the service requirements may be hindered by communication breakdowns or other hard-to-see issues related to the complexity of relationship between involved parties. In some cases, an absence of actionable information may cause various issues that may impact the cost or efficiency of providing healthcare services. For example, in some cases: patients may be assigned more (or more costly) resources than they actually require; some providers may be over utilized while others may be under utilized; resource or providers may be miss-allocated; or the like.

Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 8 illustrates a portion of a schema for entity relationships and versioning in accordance with one or more of the various embodiments;

FIG. 9 illustrates a portion of a schema for entity relationships and versioning in accordance with one or more of the various embodiments;

DETAILED DESCRIPTION OF VARIOUS EMBODIMENTS

Figure 1:
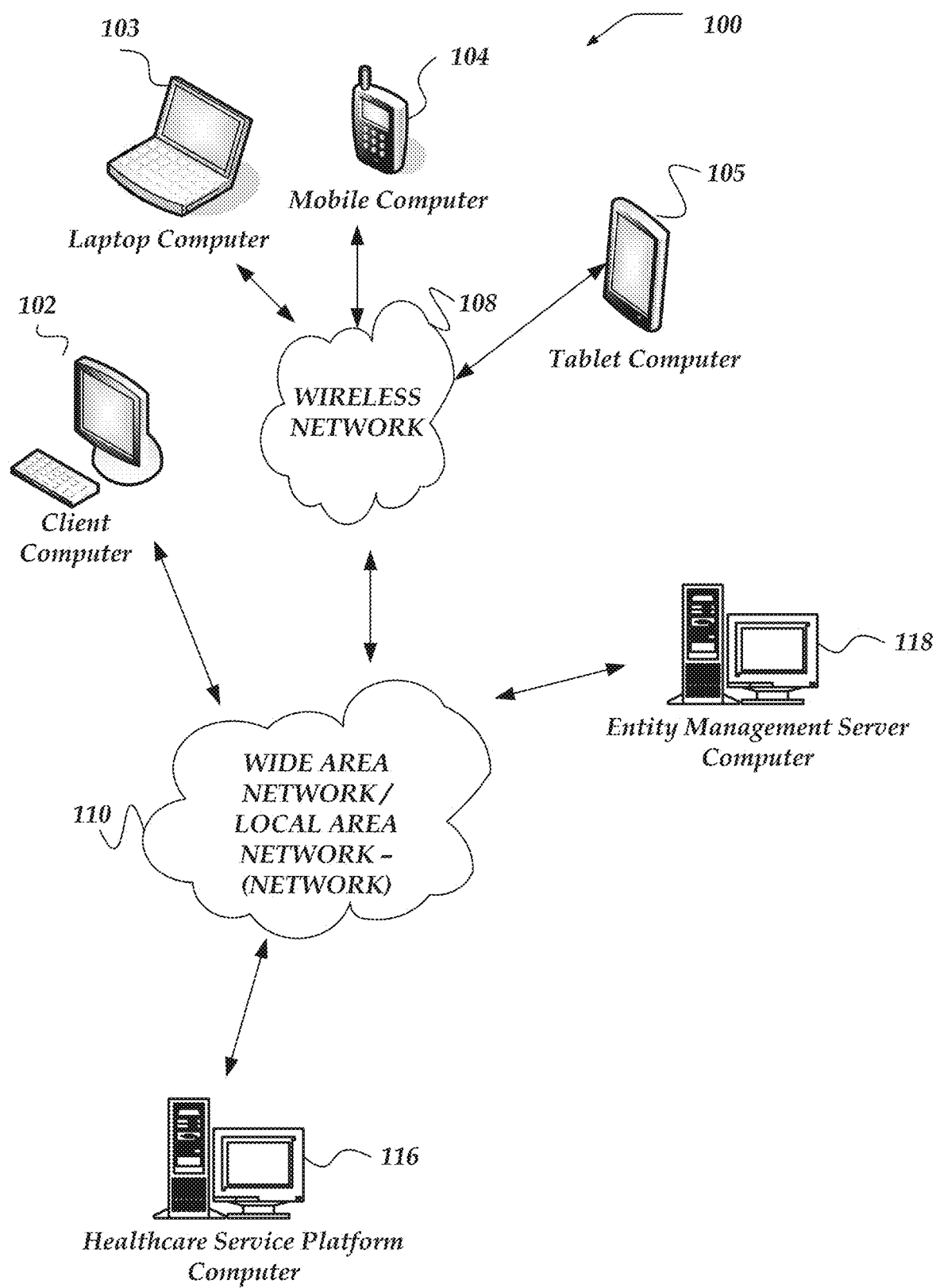
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on"

is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "provider" refers to a professional care provider that may be assigned to provide care services for a patient visit. Providers may include physicians, physician assistants, nurse practitioners, nurses, medical assistants, nursing assistants, physical therapists, or the like. In many cases, providers may be individual service providers. In some cases, providers may be third party organizations rather than individuals.

As used herein, the term "provider organization" refers to an organization that provided professional care services to patients. Provider organizations may include large nation-wide healthcare networks, state-wide networks, private clinics, independent hospitals, urgent care networks, or the like. Generally, provider organizations represent one or more providers and provide the facilities or administrative support that enable care services to be provided to patients. In some cases, one large provider organization may be comprised of a federation of other smaller provider organizations.

As used herein, the term "patient" refers to person seeking care services from a provider organization or provider. In some cases, a guardian may be providing information or authorizing care for a patient.

As used herein, the terms "electronic medical record," or "EMR" refer to digital records that includes health information of an individual.

As used herein, the term "entity" refers to a distinct object, concept, or thing that may be modeled by a data management system or database. Entities may often represent real-world objects or concepts within a database schema.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a computing environment. In one or more of the various embodiments, a request may be provided from an application to instantiate an entity such that the request includes an entity version.

In one or more of the various embodiments, a schema that corresponds to the entity may be determined based on the entity version.

In one or more of the various embodiments, one or more foreign properties of the entity may be determined based on a traversal of the schema such that each foreign property may include a foreign entity type and a foreign entity version.

In one or more of the various embodiments, one or more relationships between the entity and one or more foreign entities may be determined based on an entity relationship table that may be separate from the schema such that each relationship may associate one or more foreign entity identifiers with the one or more foreign properties.

In one or more of the various embodiments, a native object for a native environment of the application may be generated based on the schema, the entity and the one or more foreign entities such that the native object may include one or more members that may correspond to the one or more foreign entities.

In one or more of the various embodiments, data associated with the entity and the one or more foreign entities may be provided to the application based on the native object.

In one or more of the various embodiments, changes to the data by one or more other applications may be employed to update the native object to include the changed data.

In one or more of the various embodiments, the one or more foreign entity types may be determined based on the schema and the one or more foreign properties. In some embodiments, a native object class that may be compatible with the native environment of the application maybe generated based on the schema and the one or more foreign entity types such that the native object class may declare the one or more members that may correspond to the one or more foreign entities. And, in some embodiments, the native object class may be employed to instantiate the native object.

In one or more of the various embodiments, determining the one or more relationships between the entity and the one or more foreign entities may include determining one or more relationship records from the entity relationship table based on an identifier that may correspond to the entity such that each relationship record may declare that the entity may be a parent of the one or more foreign entities and such that each relationship record may declare a foreign entity that may be a child of the entity.

In one or more of the various embodiments, one or more validators that are compatible with the native environment of the application may be generated such that each validator may correspond to a foreign entity. In some embodiments, in response to the application modifying the native object, the modifications may be validated based on the one or more validators.

In one or more of the various embodiments, the application may be registered to detect one or more messages associated with one or more modifications to the entity or the one or more foreign entities such that the one or more modifications may be performed by the one or more other applications.

In one or more of the various embodiments, one or more base properties of the entity may be determined based on the traversal of the schema such that each base property may correspond to a concrete value associated with the entity.

In one or more of the various embodiments, in response to the application modifying the data of the native object, performing additional further actions: updating the entity and the one or more foreign entities based on the modified data; generating a message that includes the modified data, wherein the message is provided to a message queue; employing the message queue to provide the other message to the one or more other applications; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, healthcare service platform computer 116, entity management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, healthcare service platform computer 116, entity management server computer 118, or other computers.

Client computers 102-105 may further be configured to include a client application that enables an end-user to log into an end-user account that may be managed by another computer, such as healthcare service platform computer 116, entity management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, results provided by healthcare service platform computer 116, entity management server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, healthcare service platform computer 116, entity management server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of healthcare service platform computer 116 or entity management server computer 118 is described in more detail below in conjunction with FIG. 3. Although FIG. 1 illustrates healthcare service platform computer 116 or entity management server computer 118 as single computers, the innovations or embodiments are not so limited. For example, one or more functions of healthcare service platform computer 116, entity management server computer 118, or the like, may be distributed across one or more distinct network computers. Moreover, in one or more embodiments, healthcare service platform computer 116 entity management server computer 118 or may be implemented using a plurality of network computers. Further, in one or more of the various embodiments, healthcare service platform computer 116 or entity management server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
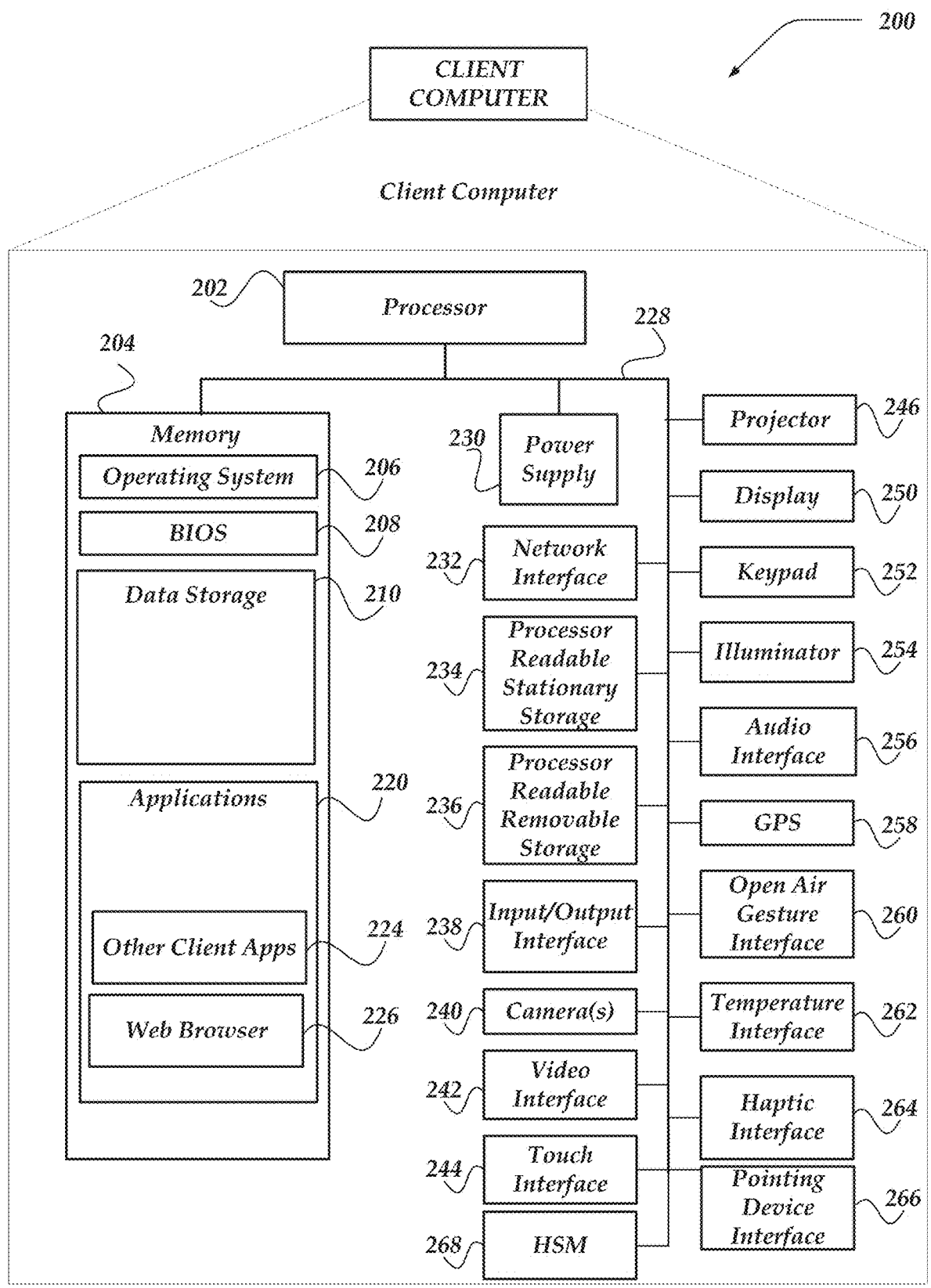
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, Apple Corporation's IOS® operating system, Android®, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, performance metrics, log data, application programing interface (API) calls, or the like, combination thereof, with healthcare service platforms or entity management servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
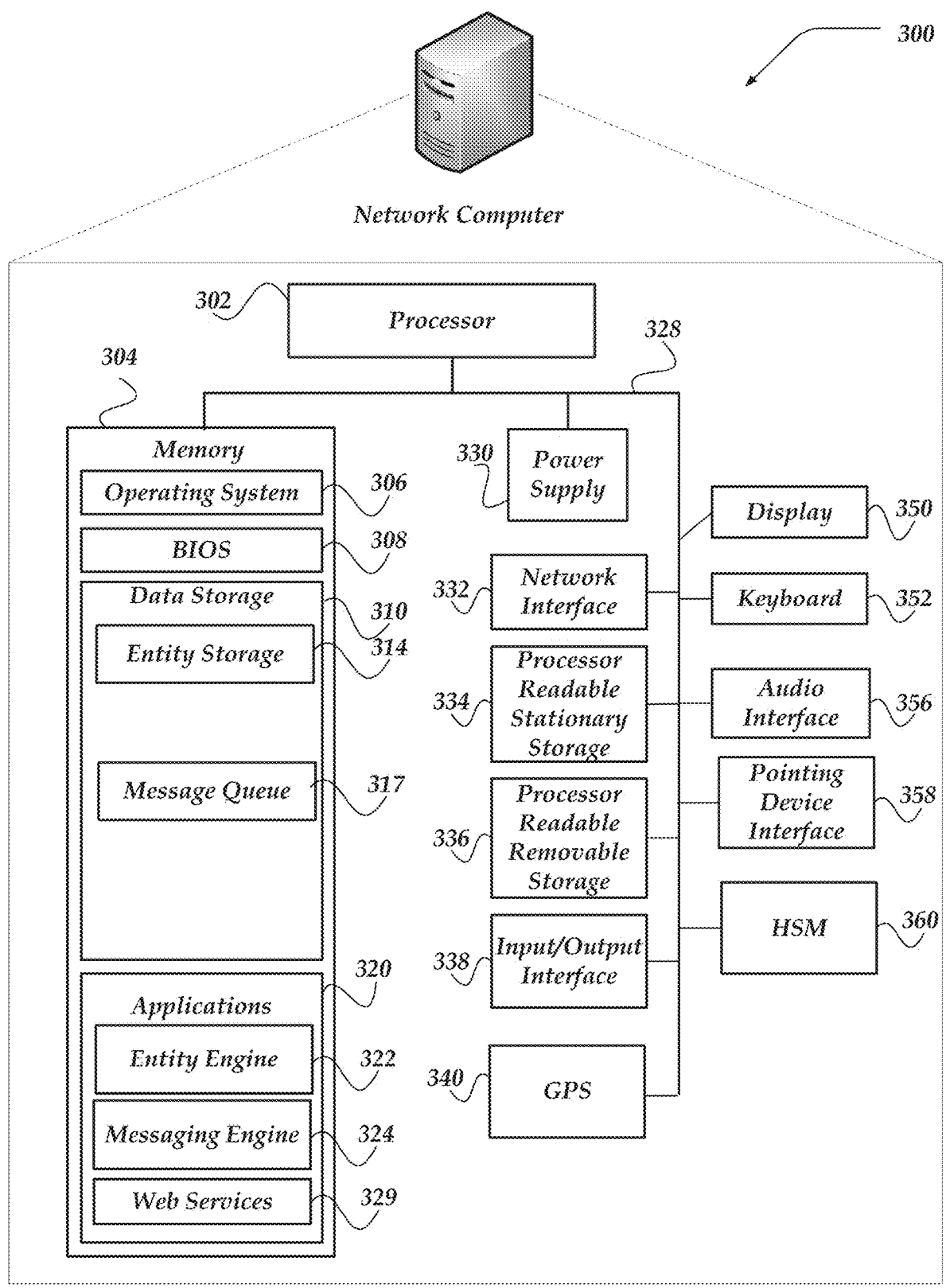
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of healthcare service platform computer 116 or entity management server computer 118 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, entity engine 322, messaging engine 324, web services 329, or the like, may be arranged to employ geo-location information to select one or more localization features, such as, time zones, languages, currencies, calendar formatting, or the like. Localization features may be used when scheduling/visit information, provider availability, patient preferences, user-interfaces, generating reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's IOS® operating system. The operating system may include, or interface with a Java virtual machine (JVM) or other run-time engines that enable control of hardware components or operating system operations via application programs executed the JVM or other run-time execution engines.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, provider organization information, 314, provider information 316, patient information 317, visit information 318, matching models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include entity engine 322, messaging engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, entity engine 322, messaging engine 324, web services 329, or the like, may be operative in a cloud-based computing environment. In one or more of the various embodiments, these applications, and others, that comprise a healthcare service platform may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to entity engine 322, messaging engine 324, web services 329, or the like, may be provisioned and de-commissioned automatically.

Also, in one or more of the various embodiments, entity engine 322, messaging engine 324, web services 329, or the like, may be located in virtual servers running in a cloud-based computing environment rather than being tied to one or more specific physical network computers. Likewise, in some embodiments, one or more of entity engine 322, messaging engine 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
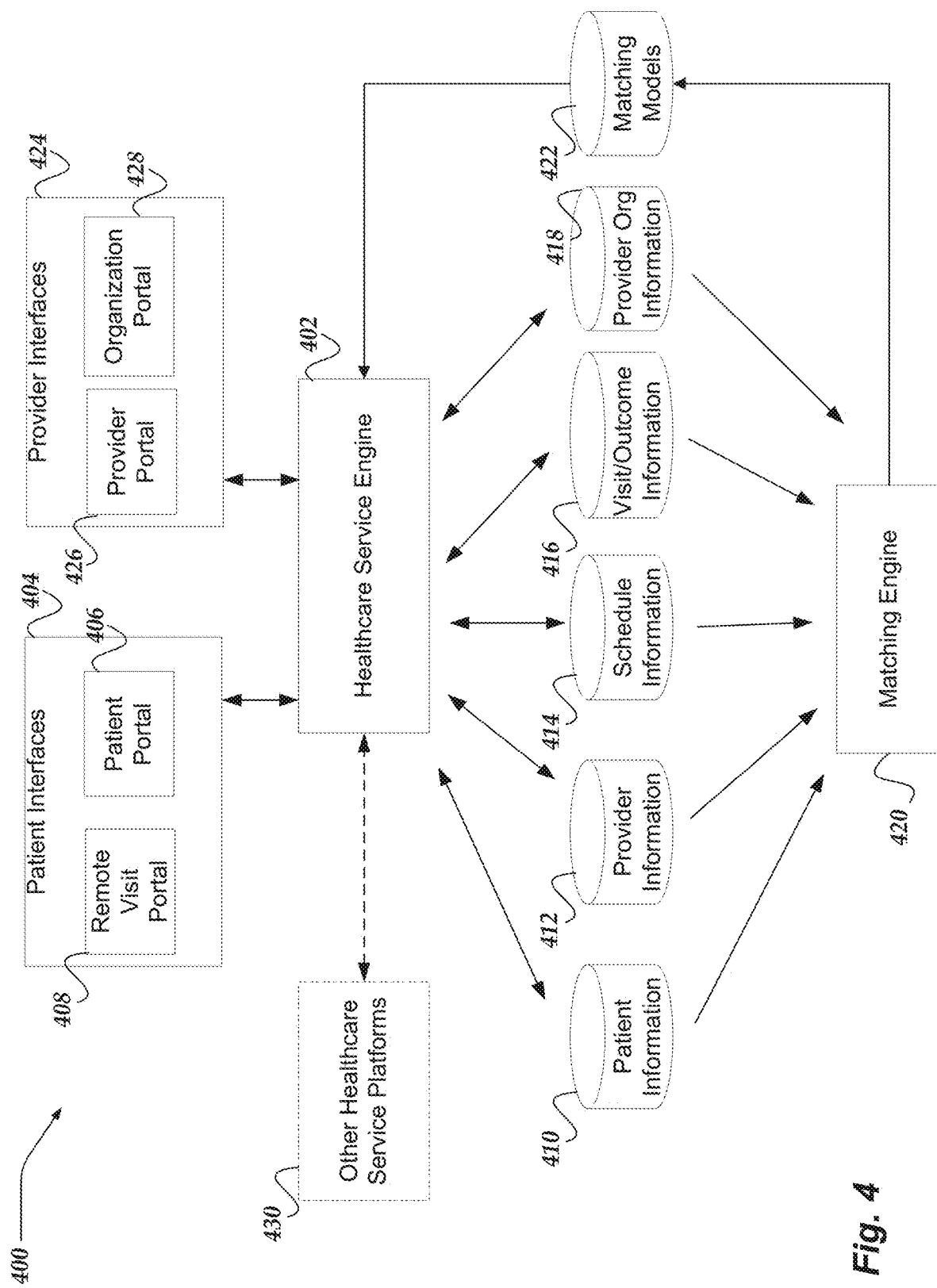
FIG. 4 illustrates a logical architecture of a system for a healthcare service platform that may include entity relationships and versioning in accordance with one or more of the various embodiments.

FIG. 4 illustrates a logical architecture of system 400 for a healthcare service platform that may include entity relationships and versioning in accordance with one or more of the various embodiments. In one or more of the various embodiments, healthcare service platforms may be comprised of various elements, including, healthcare service engine 402, patient interfaces 404, remote visit portal 406, patient portal 408, patient information data store 410, provider information data store 410, schedule information data store 410, visit/outcome information data store 410, matching engine(s) 420, learned models data store 422, provider interfaces 424, provider portal 426, provider organization portal 428, or the like.

Also, in some cases, for some embodiments, one or more healthcare service platforms may be configured to communicate/coordinate with one or more other healthcare service platforms, such as, other healthcare service platforms 424.

In one or more of the various embodiments, healthcare service engines, such as, healthcare service engine 402 may be arranged to process various requests from patients, providers, or provider organizations. In some embodiments, healthcare service engines may be arranged to process requests from one or more authorized third-party services, such as, insurance providers, or the like. In some embodiments, healthcare service engines may be arranged to exchange information with other third-party services, such as, EHR systems, hospital management systems, billing services, or the like. In some embodiments, healthcare service engines may be arranged to enable patients to schedule visits with providers. Also, in some embodiments, healthcare service engines may be arranged to enable provider organizations to manage patients, providers, visits, or the like.

In one or more of the various embodiments, healthcare service platforms may be arranged to provide one or more patient interfaces, such as patient interfaces 404. In some embodiments, patient interfaces 404 represent one or more user interfaces or APIs that may employed by patients or services on behalf of patients to access healthcare services.

In some embodiments, patient interfaces may provide one or more patient portals, such as, patient portal 406. In one or more of the various embodiments, patient portals may be arranged to provide interactive reports, user interfaces, or the like, that enable patients to view or interact with their healthcare providers. In some embodiments, patient portals may be arranged to enable patients to review upcoming appointments, past appointments, request new appointments, or the like. Further, in some embodiments, patient portals may be arranged to enable to patients to view some or all of their electronic health records (EHRs). In some embodiments, patient portals may be communicatively coupled with healthcare service engine 402 using one or more networks. Accordingly, in some embodiments, healthcare service engines may be arranged to provide the information that may be presented in the patient portal.

In one or more of the various embodiments, provider organizations may be enabled to customize user interfaces or reports that may be provided to their patients, including the care settings, providers and modalities that may be best for them based upon their interests, motivations and clinical needs. In some embodiments, portions of patient portals may be customized by patients. In some embodiments, healthcare service engines may be arranged to determine the user interfaces or reports that may be presented or accessed from patient portals based on rules, instructions, or the like, provided via configuration information to account for local circumstances or local requirements.

In one or more of the various embodiments, patient portals may be comprised of one or more mobile applications, desktop applications, web-based applications, or the like.

In one or more of the various embodiments, patient interfaces 404 may be arranged to provide remote visit portals, such as, remote visit portal 408. In one or more of the various embodiments, remote visit portals may be arranged to enable patients and providers to conduct scheduled visits using video conferencing, teleconferencing, or the like, or combination thereof. In some embodiments, remote visit portals may be arranged to include virtual waiting rooms that enable providers/provider organizations to request or collect pertinent information from patients that may be queued for scheduled visits.

In some embodiments, remote visit portals may be arranged to provide user interfaces for chat services that enable incoming patients to describe symptoms, submit questions, or the like. In some embodiments, healthcare service engines may be arranged to provide both computer automated chat systems (e.g., chat bots) as well as human monitored chat services.

In one or more of the various embodiments, healthcare service engines, such as, healthcare service engine 402 may be arranged to employ one or more data stores to collect or organize some or all of the information associated with providing healthcare services. In some embodiments, the one or more data stores may include data stores, such as, patient information data store 410, provider information data store 412, schedule information data store 414, visit/outcome information data store 416, provider organization information data store 418, or the like. Accordingly, in some embodiments, healthcare service engines may be enabled to store various information associated patients, providers, or provider organizations, such as, vital information, administrative information, billing/payment information, insurance information, visit history, scheduled appointments, medical history, financial information, performance tracking information, resource utilization information, or the like. In some embodiments, healthcare service engine may be arranged to provide EHRs for patients.

Alternatively, in some embodiments, healthcare service engines may integrate with one or more authorized EHR providers rather than acting as a repository for EHRs. Accordingly, in some embodiments, healthcare service engines may be arranged to exchange some information with authorized EHRs rather than storing EHR information in local data stores.

Likewise, in some embodiments, healthcare service engines may be enabled to store various information associated with providers, such as, availability information, utilization information, specialty information, training/education information, compensation information, visit outcome information, scheduled appointments, or the like.

Also, in one or more of the various embodiments, healthcare service platforms may include one or more matching engines, such as, matching engine 420, or the like. In some embodiments, matching engines may be arranged to employ information collected by healthcare service engines for training or generating one or more machine learning models, including one or more predictive models, one or more classification models, or the like. In some embodiments, matching engine 420 may be enabled to access the various data stores to train one or more matching models that may be stored in matching model data stores, such as, matching data store 422.

In one or more of the various embodiments, healthcare service platforms may be arranged to include matching engines that may apply different machine learning techniques to train models for a variety of applications. Accordingly, in some embodiments, healthcare service engines or matching engines may be arranged to employ configuration information to determine which actions to perform for machine learning. For example, matching engine 420 may be arranged to dynamically load or instantiate one or more machine learning trainers based on configuration information to account for local circumstances or local requirements. In some embodiments, one or more machine learning engines may be hosted in computing environments that may be separate from healthcare service engines. For example, in some embodiments, healthcare service platforms may be arranged to employ one or more off-site machine learning compute clusters hosted in a cloud computing environment to train matching models for the healthcare service platform.

Also, in some embodiments, healthcare service engines may be arranged to provide one or more provider interfaces, such as, provider interfaces 424 that enable providers or provider organizations (e.g., administrative personnel, or the like) to engage with the healthcare service engines. Accordingly, in some embodiments, provider interfaces may include one or more provider portals, such as, provider portal 426 that may enable providers to review practice related information, such as, upcoming appointments, or the like. In some embodiments, provider portals may be arranged to enable providers to communicate with patients (e.g., secure messaging), review past visits, accept/decline visit requests, approve/disapprove treatment requests, approve/disapprove prescription requests, or the like.

Also, in one or more of the various embodiments, provider interfaces may be arranged to provide provider organization portals that enable provider organization representatives to review or interact with practice related information. In some embodiments, provider organization portals may include some information or user interfaces that may be similar to provider portals, except rather than being limited to one provider, provider portals may include information (e.g., patient queues, schedules, visit history, or the like) associated with more than one or more provider. For example, in some embodiments, provider portals may include scheduling/visit information for an entire healthcare network, hospital, clinic, specialty group, or the like.

In one or more of the various embodiments, healthcare service engines may be arranged to restrict access to the information included in provider portal based on the organizational structure of the provider organizations. Accordingly, in some embodiments, one or more users of a provider portal may have access to different information. For example, in some embodiments, a healthcare service engine may provide a provider portal scoped to multiple clinic/hospital locations in a healthcare network while other provider portals may be scoped to one location or one group within the same healthcare network.

Further, in some embodiments, healthcare service engines may be arranged to integrate with one or more other healthcare service platforms, such as, other healthcare service platforms 430. In some embodiments, healthcare service engine may be arranged to rely on other healthcare service platforms to store some or all patient information, provider information, scheduling information, or the like. For example, healthcare service engines may be arranged to communicate with the other healthcare service platforms to access or update patient information.

Also, in some embodiments, healthcare service platforms may be arranged to support more than one provider organizations at the same time. In some cases, one or more provider organizations may require customized features that may including the need to support different entities or entities with different versions. Accordingly, in some embodiments, healthcare service platforms may be arranged to employ entity relationships and versioning to reduce the encumbrance of supporting different entities or entity versions for different provider organizations.

In some embodiments, healthcare service platforms may employ various data structures for organizing data associated with providing healthcare services. Conventionally, in some cases, data may be stored in relational databases such that there may be a mismatch between how data may be represented in relational databases and how the data may be represented or utilized within applications. For example, in some cases, applications may represent data as objects that encapsulate data with behaviors or actions while databases may be optimized for queries or other operations that may be record oriented rather than object oriented. Accordingly, in some cases, there may be logical mismatch related object focused applications and record focused databases—the so-called ORM impedance mismatch.

Accordingly, in some embodiments, healthcare service engines or other applications may be arranged to use entity relationships and versioning for data representation or data management.

Figure 5:
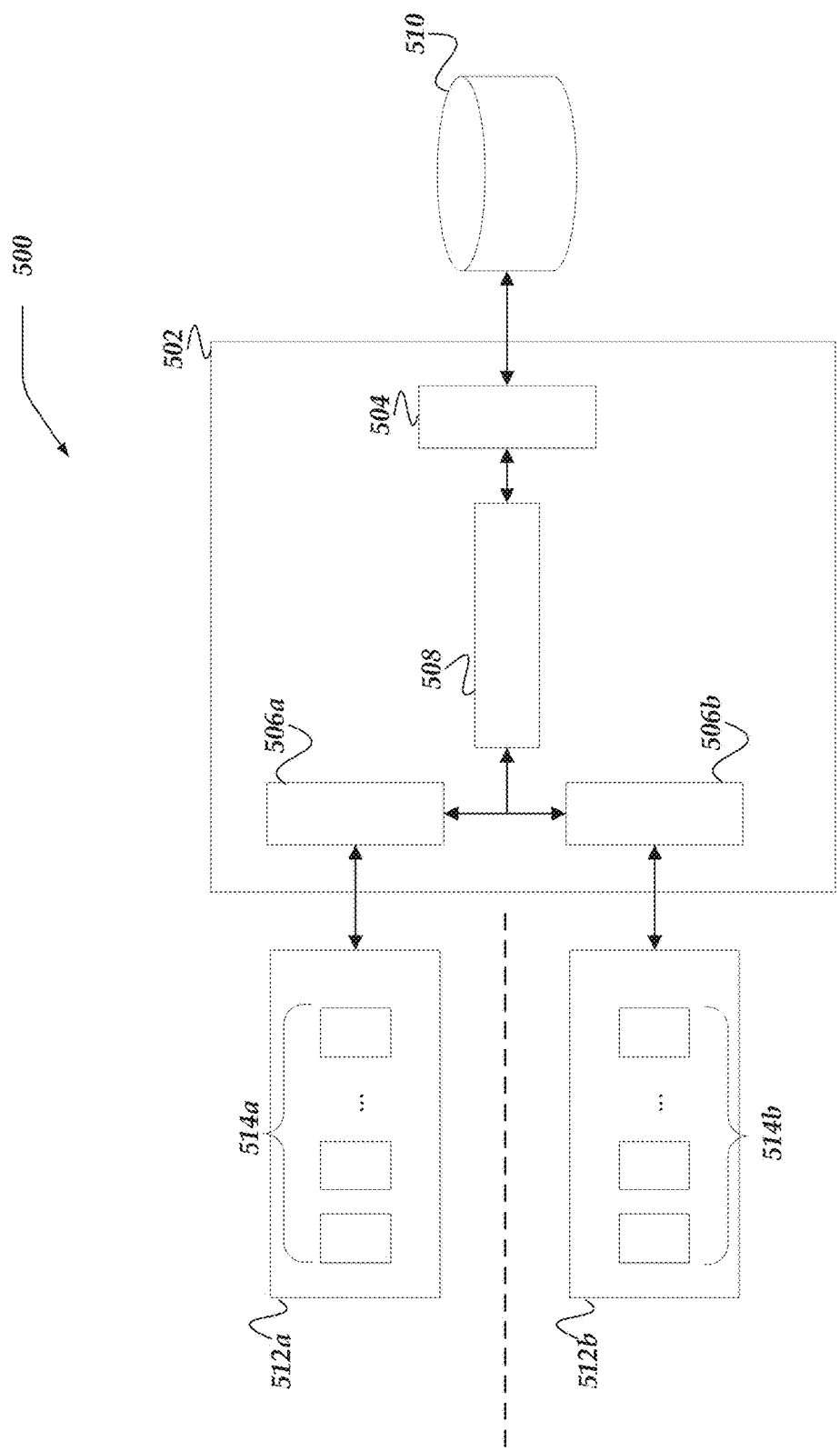
FIG. 5 illustrates a logical schematic of a system for entity relationships and versioning in accordance with one or more of the various embodiments.

FIG. 5 illustrates a logical schematic of entity system 500 for entity relationships and versioning in accordance with one or more of the various embodiments. As described above, various applications may be arranged to employ entity systems such as entity system 500 for representing data.

Accordingly, in some embodiments, entity systems such as entity system 500 may include one or more entity engines such as entity engine 502. In some embodiments, entity engines may be arranged to include various interfaces such as interface 504 for exchanging commands or messages with databases, such as database 510, or the like. Likewise, in some embodiments, entity engines may include one or more interfaces for providing entities or entity related services to applications, such as, interface 506a or interface 506b. Further, in some embodiments, since entity engines may be configured to support applications that may have one or more components that may be distributed across more than one network computers, one or more cloud-environments, or the like, message queues, such as message queue 508 may be provided to distribute entity data, entity information/ status, notifications, or the like, to the various entity engine components as well as communicating entity information with one or more applications.

In one or more of the various embodiments, applications, such as application 512a or application 512b may be considered to be independent executables running on different hosts or different instances. For example, in some embodiments, application 512a may be a healthcare service portal for a first provider organization while application 512b may be a healthcare services portal for a second provider organization.

In some embodiments, provider organizations may be operating in the same industry or problem domain (e.g., healthcare services) such that they may share several of the same entities or entity types, such as, patients, providers, visits, visit types, insurance providers, or the like. However, in some embodiments, even though they may be in the same industry each provider organization may require one or more customized entities. Likewise, in some cases, different provider organizations may require different versions of applications with support for entities with different custom features (e.g., different attributes or properties). In some cases, entities in applications for different provider organizations may include one or more different fields/properties such that fine-grain versioning may be advantageous.

Accordingly, applications, such as, application 512a or application 512b may be arranged to represent data internally using one or more entities, such as entities 514a or entities 514b. In this example, in some embodiments, entities 514a may be considered to be a heterogeneous collection of various entities used in or by an application that may require storage in a backing store such as database 510. For example, in some embodiments, applications for healthcare services may include entities that represent patients, providers, visits, schedules, insurance providers, clinic/lab locations, or the like, as well as generic/conventional entities for representing more generic data such as telephone numbers, addresses, billing/accounting entities, or the like.

In this example, entities 514a may represent entities having data specifically for application 512a while entities 514b may represent entities having data specifically for application 512b. In some cases, some entities included in entities 514a and entities 514b may be the same entity type or same version. Also, in some cases, for some embodiments, one or more entity in entities 512a or entities 512b may represent the same data such that two entity instances may represent the same data. For example, the same patient may be represented by two different entity instances, one in application 512a and one in application 512b.

In one or more of the various embodiments, applications may be arranged to access entities via entity engines or entity engine interfaces, such as, entity engine interface 506a or entity interface 506b. Accordingly, in some embodiments, entity engines may be arranged to marshal data from database 510 into one or more entities. Sometime this may be referred to as inflating entities using data from the database. Likewise, in some embodiments, entity engines may be arranged to deflate entities to store provided or updated data in the database.

Figure 6:
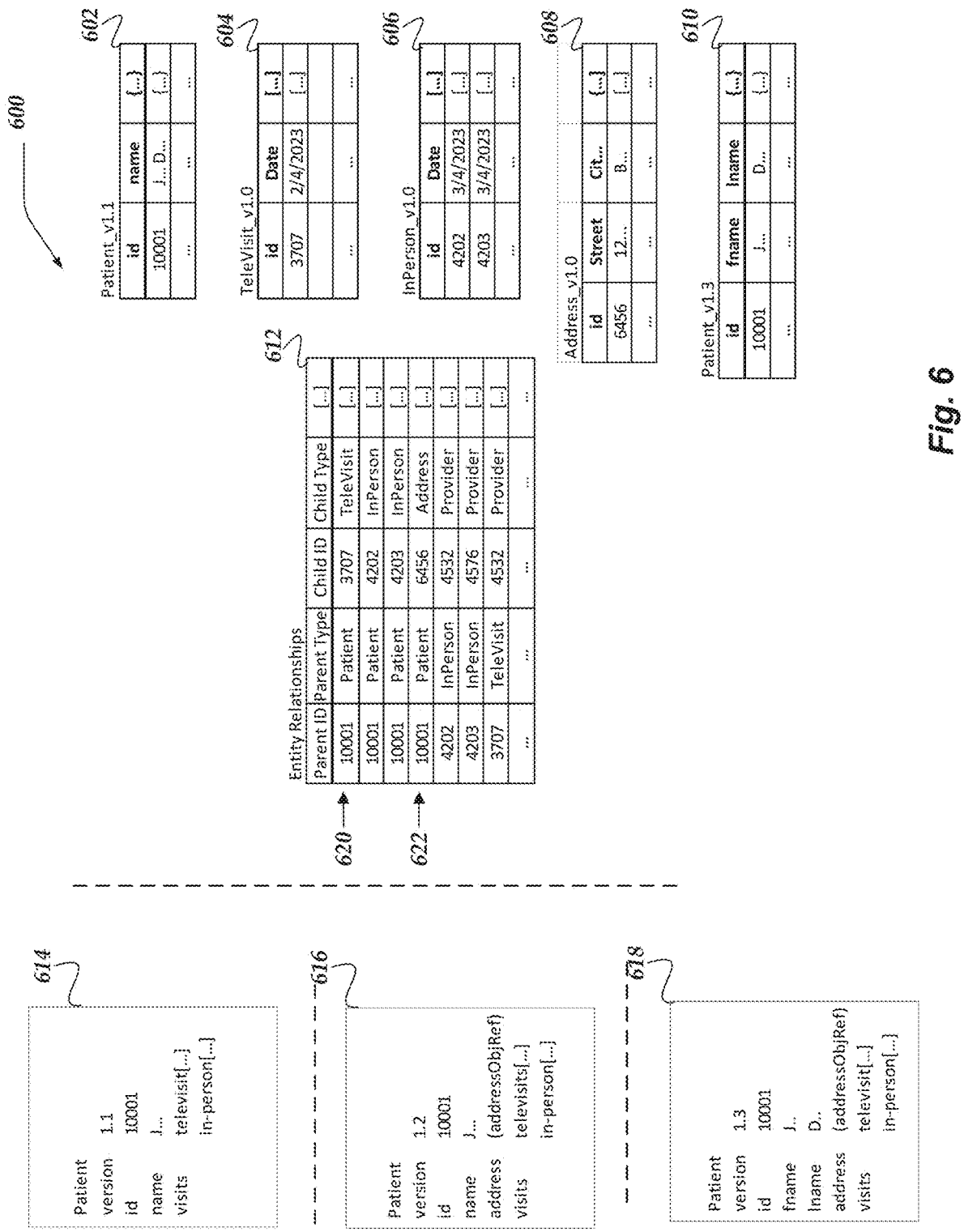
FIG. 6 illustrates a logical schematic of a system for entity relationships and versioning in accordance with one or more of the various embodiments.

FIG. 6 illustrates a logical schematic of system 600 for entity relationships and versioning in accordance with one or more of the various embodiments. System 600 illustrates an example of how entities may be deployed across different applications.

Accordingly, in this example, for some embodiments, database tables such as table 602, table 604, table 606, table 608, or table 610 may represent data for different entities or entity versions. In this example, these tables may be considered to be used for storing data for one or more of entity 614, entity 616, or entity 618.

In this example, for some embodiments, entity 614, entity 616, entity 618 may be considered to represent the same patient/person for three different applications or three different versions of the same application. For example, entity 614 may represent how the same patient may be represented for a first provider organization while entity 616 or entity 618 may illustrate how the same patient may be represented in different applications or different application versions. In some cases, different provider organizations may require different entity versions depending on local requirements or local circumstances.

In some embodiments, entity engines may be arranged to provide entities that may be considered objects or object-like, in that entity instances may represent the various properties or features of patients (as presented in the applications). One of ordinary skill in the art will appreciate that entities may have an arbitrary number of various properties depending on the data being represented or features being encapsulated. However, in this example, for brevity and clarity a reduced or limited number of properties or other entity features (e.g., interfaces, methods, constructors, destructors, or the like) are included.

For example, in this example, patient entity 614 includes a patient identifier (10001), patient name, a list of in-person visits associated with the patient, and a list of tele-visits associated with the patient.

Upon inspection, in this example, patient entity 616 may be similar patient entity 614, such that they both include patient identifier, patient name, and visit information. However, in this example, patent entity 616 includes an 'address' property that is omitted from patient entity 614. Likewise, in this example, for some embodiments patient entity 618 includes a different representation of the patient's name using separate fields for firstname and lastname rather than a single field for the patient's name.

Notably, in this example, for some embodiments, entity 614, entity 616, and entity 618 may represent the same patient. Accordingly, in some embodiments, if the patient that corresponds to patient identifier 10001 has another in-person with the provider organizations, it will show in the in-person visit list of each of entity 614, entity 616, and entity 618.

In one or more of the various embodiments, entity engines may be arranged to generate one or more data structures for representing relationships that may exist between entities that may comprise a system. Note, these data structures will be referred to herein as tables or database tables.

In some embodiments, entity engines may be arranged to generate 'names' for table based on the type of entity and the version of that type of entity. In this example, each name of the tables for storing entities may be prefixed by the name of the entity and postfixed by a version indicator. Note, in some embodiments, table identifiers may use different formats than as shown here as long as the tables for a given entity type or entity version may be identified. For example, in some embodiments, entity engines may be arranged to provide one or more tables (not shown) that map table names or table versions to entity types.

In this example, for some embodiments table 602 may store data for representing patients using records that each have an identifier and a name. Also, in this example, for some embodiments: table 604 may store data for representing tele-visit patient visits; table 606 may store data for representing in-person patient visits; table 608 may store data for representing addresses; and table 610 may store data for a different version of patient. Accordingly, in some embodiments, entity engines may provide two or more schemas that may represent different versions of the same type of entity. Or as in this example, entity engines may provide different representations the same items (e.g., patients). Accordingly, here in this example, patient entity 614, patient entity 616 and patient entity 618 may represent the same patient.

In one or more of the various embodiments, the attributes or properties for different entities or entity versions may be declared in by entity schemas (not shown here) that may correspond to an entity type and entity version. Accordingly, in some embodiments, entity schema may declare a version identifier as well as the one or more properties of the entity. In this example, in some embodiments, entity engines may employ a patient schema of version 1.1 to define patient entity 614. Accordingly, in some embodiments, the properties included in patient entity 614 may be assumed to be declared in patient entity schema version 1.1 (not shown). Likewise, for some embodiments, the properties included in patient entity 616 may be assumed to be declared in patient entity schema version 1.2 (not shown). And, likewise, for some embodiments, the properties included in patient entity 618 may be assumed to be declared in patient entity schema version 1.3 (not shown).

Further, in some embodiments, if a entity has a relationship with another entity, entity engines may be arranged to represent relationships between entities using entity relationship table 612. In some embodiments, entity relationship tables may be arranged to provide a flexible representation of relationships between entities. In this example, for some embodiments, entity relationship table 612 may include columns such as, parent id, parent type, child id, child type, or the like, for representing how different entities may be related to each other.

For example, for some embodiments, record 620 shows that the patient with patient id of 10001 is associated with a tele-visit having the id of 3707. Accordingly, in some embodiments, by inspection, the schema for patient entity 614 may be assumed to declare that version 1.1 patient entities have relationships with tele-visits and in-person visits. Thus, for example, if an application employs a entity engine to instantiate a version 1.1 patient entity, the entity engine may be arranged to generate a data structure such as patient entity 614.

Similarly, in some embodiments, by inspecting patient entity 616 it may be determined that the schema corresponding to patient entity 616 is different than the schema used for patient entity 614 or patient entity 616. Namely, in this example, patent entity 616 includes an 'address' property while patient entity 614 omits an address property. Likewise, for some embodiments, patient entity 618 may be instantiated using another different schema that declares a first name property and a last name property. As illustrated here, for some embodiments, entity engines may be arranged to include a version property in schema generated entities to enable entities to be inspected to determine their version number.

Accordingly, in some embodiments, entity engines may be arranged to provide interfaces or APIs that enable calling applications to supply a version identifier with request for instantiating entities. For example, is an application requests a version 1.3 patient, entity engines may be arranged to lookup a patient entity schema with a version of 1.3 and use the declarations in that schema to determine which properties should be included in the patient entity.

In some embodiments, entities that have different versions may represent the underlying object or item even though their corresponding entities may have different properties. In this example, record 626 shows that patient with id 10001 is associated with address 6456. But, a review of patient entity 614 finds that the address property is absent while patent entity 616 does include an address property. This may be because the version 1.1 patient schema does not declare a property for address while the version 1.2 patient schema does declare an address property.

Also, in some embodiments, some properties of an entity may be considered inherent properties that are not associated with a separate entity. Typically, such properties may be used to store string values, numeric values, or other concrete types that are not references or pointers to other entities. In this example, for some embodiments, patient entity 614 includes a 'name' property. However, a review of entity relationship table 612 will show that there is no entity relationship linking patient 'name' to patients. This may indicate that the property is part of the patient table, such as table 602.

In some embodiments, entity engines may be arranged to associate database tables with the schema names and schema versions of their corresponding entities. In this example, tables are named using the entity type name followed by a version of the schema. Note, in this example, patient table 602 is named 'Patient_v1.1' to represent that it stores data for patients that correspond to the patient schema version 1.1. Similarly, in this example, patient table 610 is named 'Patient_v1.3' to represent that it stores data for patients that corresponds to the patient schema version 1.3. Thus, in some cases, changing an entity schema may result in a corresponding version of a database table to store the data.

However, in some embodiments, entity engines may be arranged to provide different versions of schemas for entity versions that do not correspond to different versions of database tables. For example, in this example, patient entity 616 has a version of 1.2 but in this example, a version 1.2 patient database table is not present. This may be because the change to the schema introduced a new relationship. Thus, in some embodiments, entity engines may be arranged to interpret schema version 1.2 (not shown) to implement the relationship (patient→address) in entity relationship table 612 rather than requiring a different database table. For example, record 622 establishes a relationship between patient id 10001 and address id 6456. This relationship may be declared in the patient schema without impacting individual data tables.

Figure 7:
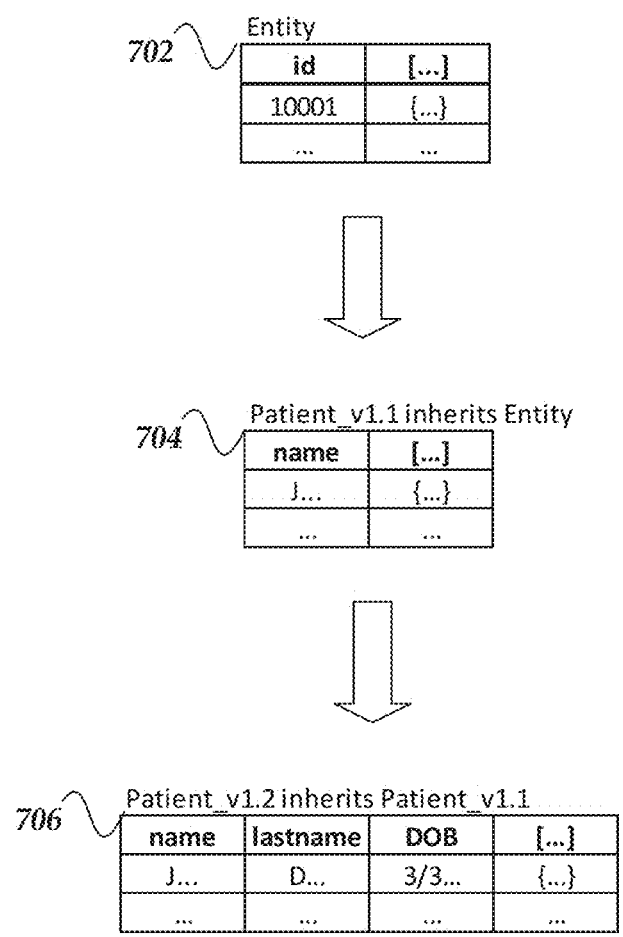
FIG. 7 illustrates a logical schematic showing how tables for entity relationships and versioning may be arranged in accordance with one or more of the various embodiments.

FIG. 7 illustrates a logical schematic showing how tables for entity relationships and versioning may be arranged in accordance with one or more of the various embodiments. In some embodiments, entity engines may be arranged to support table inheritance. In some cases, databases may support a feature that enable tables to be declared as inheriting from other tables. In some embodiments, a top level table may be defined such that it includes one or more fields that may be common to all entity types. Accordingly, in some embodiments, tables for storing entity data may be declared as inheriting from the common table. Likewise, in some cases, some new versions of entity data table may be declared as inheriting from a prior version of an entity data table for the same entity type.

In some embodiments, entity engines may be arranged to generate tables such as table 702 to store one or more values that are common to all entities. Accordingly, in some embodiments, entity data tables for particular entities (e.g., patients, providers, visits, or the like) such as table 704 may be declared to inherit from a base table, such as table 702 while declare one or more columns that may be required for the particular entity. In this example, table 704 represents a table for storing data for patient entities that includes a column for storing the name of the patient. Further, in some embodiments, as shown with table 706, if a new version of a patient may be required, a table that may inherit from an earlier version of the entity type. In this example, for some embodiments, table 706 represents a table for data for a version of Patients where each patient includes a lastname attribute and a date of birth attribute.

Note, in some embodiments, inheritance features may be implemented directly by entity engines rather than by relying on them being provided by the underlying database server. Also, in some embodiments, inheritance at the table level may be omitted depending on local circumstances or local requirements.

FIG. 8 illustrates a portion of schema 800 for entity relationships and versioning in accordance with one or more of the various embodiments. In some embodiments, schemas may be defined using various data definition languages. In this example, for some embodiments, schema 800 is represented using JSON or JSON-like notation. One of ordinary skill in the art will appreciate that other computer languages or data definition languages (DDLs) may be employed without departing from the scope of these innovations. Likewise, in some embodiments, field names for defining parts of schemas may vary depending on the particular DDLs being used to represent the schema. In some embodiments, entity engines may be configured to employ various DDLs for declaring schemas. Accordingly, in some embodiments, one or more grammars, parsers, libraries, instructions, or the like, may be provided via configuration information for interpreting DDLs to account for local circumstances or local requirements.

In some embodiments, schemas may be configured to declare entities and entity properties. As described above, properties may include common properties such as entity type, entity version, or the like, as well as properties unique to particular entity types.

In this example, for some embodiments, schema 800 includes version field 802 which declares a version value for the schema (and the entity). In this example, version field 802 is set to version 1.1. Also, in some embodiments, schema 800 includes entity type field 804 for declare the type of entity that schema 800 represents. In this example, field 804 declares that the entity type is a Patient Entity.

In this example, different parts of entities may be grouped, nested, or scoped using features of the DDL. In this example, entities properties 806 may represent a DDL language feature that groups the declarations of entity properties.

In some embodiments, each entity may be associated with a type (entity type). In some cases, entity types may be native or so-called concrete types, such as, integers, strings, or the like. In this example, name property 810 is defined as the concrete type string. In contrast, for some embodiments, properties that may be implemented using other entities may declare a entity type with a version. In this example, items 812 declares an array for accessing information about televisits conducted with the patient. In this example, type field 814 stores an entity type and entity version field 816 stores which version of the type declared in field 814 should be used. Similarly, in this example, items 818 indicates that Patient entities should include a list/array of information about in-person visits. Accordingly, type field 820 is set to InPerson Visit (e.g., the type name of the foreign entity) with version field 822 storing the required version of the foreign property.

Accordingly, entity engines may be arranged to interpret schemas to determine one or more entity relationships based on the contents of the schemas. In some embodiments, if a schema declares that a property is an entity type rather than a concrete type, entity engines may be arranged to generate an entity relationship record that links the parent entity with the foreign entities that may be embedded entities such that foreign entities may be recorded as child entities of the parent entity in the entity relationship table.

FIG. 9 illustrates a portion of schema 900 for entity relationships and versioning in accordance with one or more of the various embodiments. Schema 900 may be considered similar to schema 800. Accordingly, for brevity and clarity, redundant descriptions of schema 900 will be omitted. In this example, type field 904 indicates that the schema declares a Patient Entity the same as schema 800. However, in this example, version field 902 has a value of 1.2 as opposed to a value of 1.1 as shown in schema 900. Thus, schema 900 may be assumed to declare a newer version of the same type of entity as declared by schema 800.

Accordingly, in this example, for some embodiments, difference from schema 800, schema 900 includes address property 906. In this example, address property 906 is further defined as an entity type of Address version 1.0. This may indicate that version 1.2 Patient entities have a relationship with version 1.0 Address entities. Accordingly, in some embodiments, entity engines may be arranged to generate entity relationship that represents that version 1.2 Patient entities may include address properties implemented by a separate version 1.0 Address entity.

Note, in this example, the difference between version 1.1 Patient entities and version 1.2 Patient entities is that version 1.2 Patient entities include a entity relationship with Address entities, presumably (in this example) used for storing the address of a patient. Thus, the change to the schema (v1.1 to v1.2) does not require modifications to the underlying patent data table since the change may be affected by generating entity relationship records rather than modifying data tables.

Figure 10:
FIG. 10 illustrates a portion of a schema for entity relationships and versioning in accordance with one or more of the various embodiments.

FIG. 10 illustrates a portion of schema 1000 for entity relationships and versioning in accordance with one or more of the various embodiments. Schema 1000 may be considered similar to schema 800 and schema 1000 described above. Accordingly, for brevity and clarity, redundant descriptions of schema 1000 will be omitted. In this example, version field 1002 and type field 1004 indicate that the schema declares a version 1.3 Patient entity. Thus, schema 900 may be assumed to declare a newer version of the same type of entity as declared by schema 800 and schema 900.

In this example, schema 1000 declares a Patient entity that includes firstname property 1006 and lastname property 1008 rather using a single name property as was declared in schema 800 and schema 900. In this example, both firstname property 1006 and lastname property 1008 are declared as concrete string types so the change will not require changes to entity relationship records. However, in some embodiments, the values for firstname property 1006 and lastname property 1008 may be stored in patient data table. Accordingly, in some embodiments, a new version of the underlying patient data table may be required. Accordingly, in some embodiments, if schema 1000 is adopted, entity engines may generate a data table version that matches the declarations in schema 1000. Thus, in some embodiments, entity engines may be arranged to generate database commands that may automatically create a new version of the data table that includes columns for firstname and lastname. Note, in some embodiments, since version 1.1 or version 1.2 Patient entities do not include firstname properties or lastname properties, the prior version of the patient table may be preserved to support applications that rely on the older versions of patient entities.

Generalized Operations

FIGS. 11-15 represent generalized operations for entity relationships and versioning in accordance with one or more of the various embodiments. In one or more of the various embodiments, processes 1100, 1200, 1300, 1400, and 1500 described in conjunction with FIGS. 11-15 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based or containerized environments. However, embodiments are not so limited and various combinations of network computers, client computers, or the like may be utilized. Further, in one or more of the various embodiments, the processes described in conjunction with FIGS. 11-15 may be used for entity relationships and versioning in accordance with at least one of the various embodiments or architectures such as those described in conjunction with FIGS. 1-10. Further, in one or more of the various embodiments, some or all of the actions performed by processes 1100, 1200, 1300, 1400, and 1500 may be executed in part by entity engine 322, messaging engine 324, or the like, running on one or more processors of one or more network computers.

Figure 11:
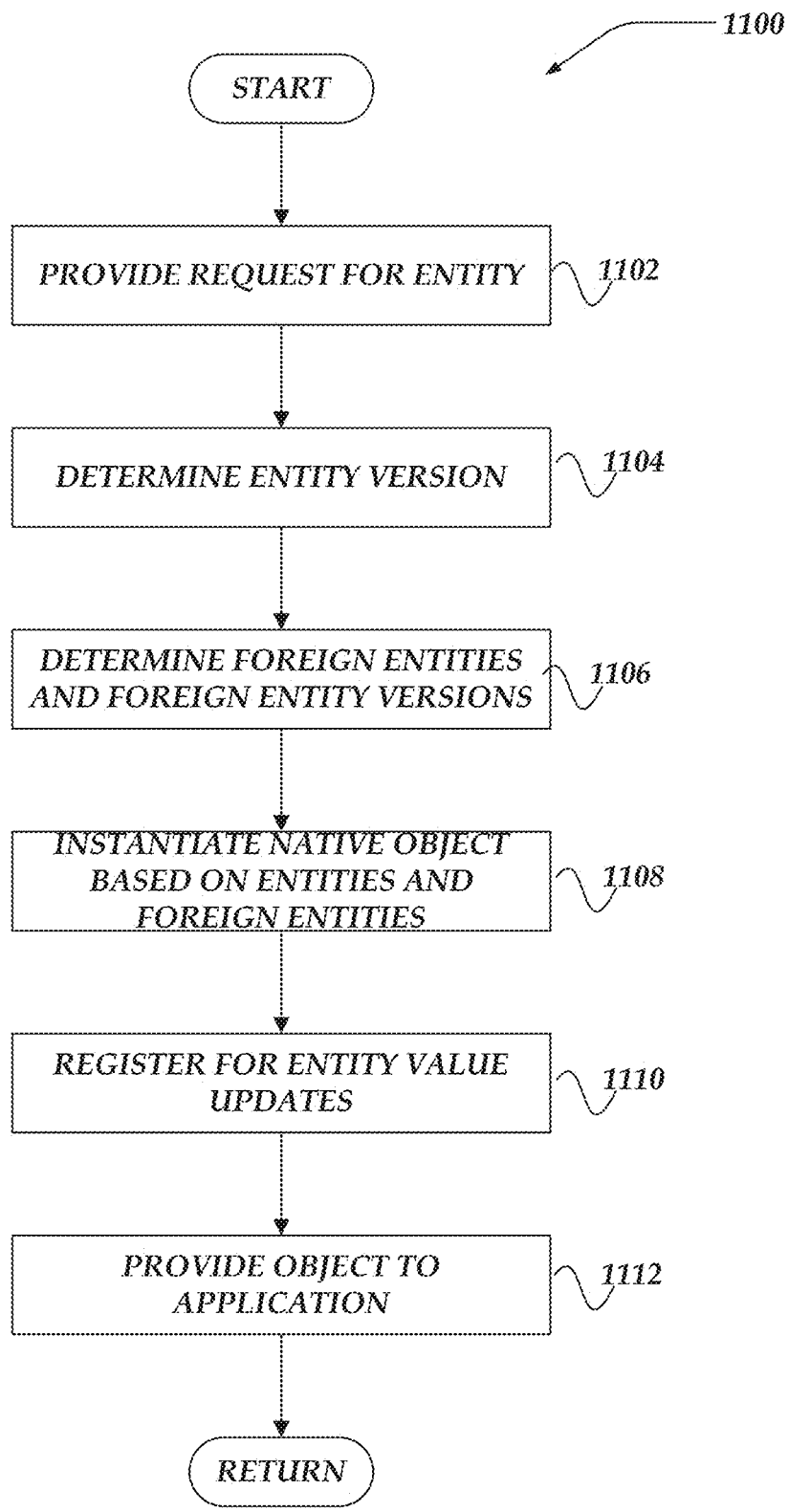
FIG. 11 illustrates an overview flowchart of a process for entity relationships and versioning in accordance with one or more of the various embodiments.

FIG. 11 illustrates an overview flowchart of process 1100 for entity relationships and versioning in accordance with one or more of the various embodiments. After a start block, at block 1102, in one or more of the various embodiments, entity engines may be provided a request for an entity. In one or more of the various embodiments, entity engines may be arranged to provide one or more interfaces that enable applications to request various entities.

At block 1104, in one or more of the various embodiments, entity engines may be arranged to determine the version of the requested entity. In some embodiments, entity engines may be arranged to default to the newest version. Also, in some embodiments, entity engines may be arranged to enable applications to request a particular entity version via a provided API. Also, in some embodiments, entity engines may be arranged to enable applications to provide or reference one or more entity schemas that may enable the particular version of interest to be determined.

At block 1106, in one or more of the various embodiments, entity engines may be arranged to determine one or more foreign entities and one or more corresponding foreign entity versions. In some embodiments, entity engines may be arranged to traverse the schema of entities to determine if there may be one or more foreign entities associated with the requested entities. In some embodiments, entity engines may be arranged to determine if an entity property may be a relationship to another entity based on the information used to declare the property in the schema (e.g., entity type, entity version).

At block 1108, in one or more of the various embodiments, entity engines may be arranged to instantiate native objects to represent the entity and foreign entities. In one or more of the various embodiments, applications may be operating in (or providing) a native application environment that may expect entities to be in particular forms. For example, a javascript application may require javascript objects to represent entities, while a C application may expect structs with supporting functions.

At block 1110, in one or more of the various embodiments, entity engines may be arranged to register one or more applications to receive entity updates. In one or more of the various embodiments, since more than one application may be working with the same entities, applications may register to receive notifications about changes that may be made by other applications. In some embodiments, entity engines may be arranged to provide APIs that enable applications to opt-in or opt-out of the change notification process.

At block 1112, in one or more of the various embodiments, entity engines may be arranged to provide the instantiated object to a calling application. In some embodiments, entity engines may be arranged to provide references or pointers to the native objects that correspond to the entities. In some embodiments, the particular type of reference may vary depending on local preferences or the local requirements of the applications.

Next, in one or more of the various embodiments, control may be returned to a calling process.

Figure 12:
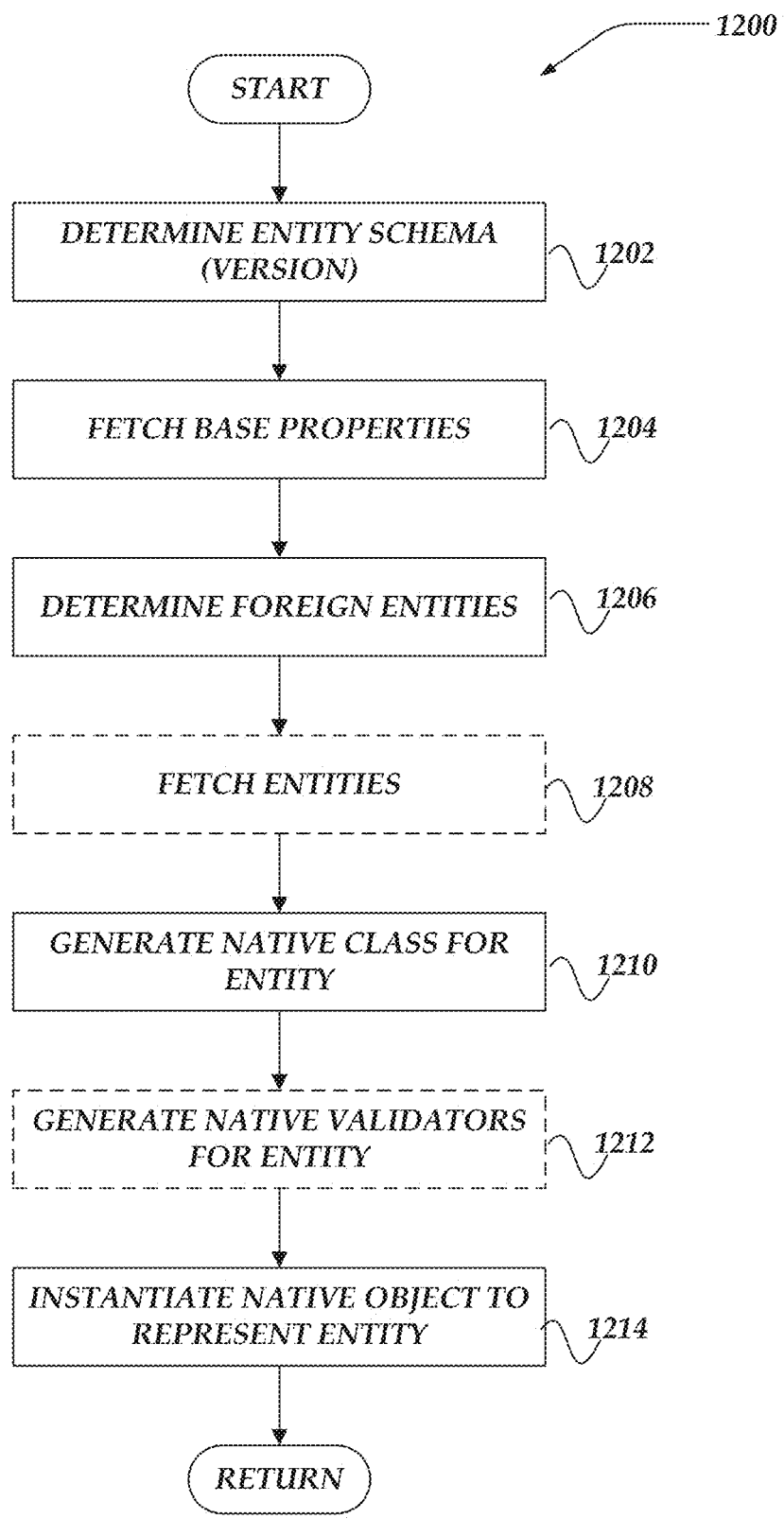
FIG. 12 illustrates a flowchart of a process for entity relationships and versioning in accordance with one or more of the various embodiments.

FIG. 12 illustrates a flowchart of process 1200 for entity relationships and versioning in accordance with one or more of the various embodiments. After a start block, at block 1202, in one or more of the various embodiments, entity engines may be arranged to determine an entity schema or schema version for one or more entities. As described above, in some embodiments, entity engines may be arranged to provide one or more interfaces that enable applications to request access to one or more entities. In some embodiments, the interfaces may include an API that enables application expressly request an entity by entity type and version. Also, in some embodiments, entity engines may provide APIs that enable applications to automatically request the latest version of an entity. Also, in some embodiments, entity engines may provide APIs that enable application to request entities based on entity type, entity version, and entity identifier. For example, in some embodiments, an application may be enabled to request the version 1.1 of Patient entity for patient id 10001 while another application may be enabled to request version 1.2 Patient entity for the same patient id. Thus, in some embodiments, both applications may interact with the "same" patient but via different versions of Patient entities.

In one or more of the various embodiments, if the entity engine may determine the schema for the requested entity version, the entity engine may be arranged to traverse the schema to determine information about the structure or relationships associated with the entity.

At block 1204, in one or more of the various embodiments, entity engines may be arranged to fetch one or more base properties of the entity.

In one or more of the various embodiments, base properties may be considered the properties of an entity that have values stored directly in the data tables for that entity. For example, if a patient data table includes a column for a patient's name as a string, the patient name may be considered a base property. Accordingly, in some embodiments, entity engines may be arranged to traverse the schema to determine the base properties.

Alternatively, in some embodiments, entity engines may generate fetch or load instructions for an entity that automatically retrieve the base properties from the corresponding entity data table. Accordingly, in some embodiments, fetching base properties for the entity may be accomplished by loading the entity from the entity data table and setting base property values based on their correspond columns in the entity data table.

At block 1206, in one or more of the various embodiments, entity engines may be arranged to determine if the request entity includes one or more foreign entities. As described above, in some embodiments, entity data tables may omit relationships (e.g., foreign keys) to other entities (foreign entities). For example, data tables for Patient entities (as shown in FIG. 6) may omit encoding the relationships with Address entities, in-person visit entities, or tele-visit entities, or the like. However, in some embodiments, entity engines may traverse the Patient entity schema to identify if there may be other entities that should be considered.

In some embodiments, the APIs used for selecting or fetching entities may include a depth limit parameter that may be used to limit how far down the relationship tree/graph the entity engine may traverse. For example, in some embodiments, a first API may automatically determine all the foreign entities that may be associated with a fetched entity. Accordingly, in this example, the entity engine may recursively traverse the schema(s) to determine all of the entities that may be related to the subject entity. In contrast, in some embodiments, for example, a second API may enable the application to provide a depth limit value that may be truncate or otherwise limit schema traversal to a given depth or distance.

At block 1208, in one or more of the various embodiments, optionally, entity engines may be arranged to fetch the one or more foreign entities (if any). Similar to how the data for a top level entity may be determined, entity engines may be arranged to determine and fetch the data for any foreign entities. Referring to FIG. 6 and FIG. 8, for example, if the application requests a fully determined version 1.2 Patient entity, the entity engine may traverse its schema to determine the patient entity (v1.2), its address entity (v1.0), one or more tele-visit entities, or one or more in-person visit entities. Alternatively, in some embodiments, if the request was for a version 1.1 Patient entity, the entity engine may provide the Patient entity (v1.1) and its visit entities.

In some cases, for some embodiments, an entity may not have any foreign entities or the depth limit associated with the request may exclude all the foreign entities. Thus, in this situation, entity engines may not fetch any foreign entities.

Note, this block is indicated as being optional because in some cases a schema for an entity may not declare any foreign entities. For example, if the entity may be exclusively comprised of properties that are concrete types, there may not be any foreign entities.

At block 1210, in one or more of the various embodiments, entity engines may be arranged to generate a native class for the entity. In some embodiments, applications making requests for entities may be provided corresponding native objects that are instantiated locally within the context of the requesting application. For example, if the application is a Java application, the entity engine may be arranged to generate java objects that correspond to the request entities. Likewise, for example, if the requesting application may be a javascript application, the entity engine may be arranged to generate javascript objects for the requesting application.

In some embodiments, entity engines may be arranged to instructions, maps, parsers, grammars, templates, or the like, provided via configuration information to account for local circumstances or local requirements. Accordingly, in some embodiments, if the native application environment requires updated or specialized operations to generate native objects that correspond to the request entities, entity engine may be arranged to determine such operations via configuration information.

At block 1212, in one or more of the various embodiments, optionally, entity engines may be arranged to one or more native validators for the entity. As mentioned above, entity engines may be arranged to support an arbitrary number of different computer languages or computing environments. In some cases, for some embodiments, this may include supporting one or more programming languages (e.g., Javascript, or the like) that may not provide native type-safety or type-enforcement. Accordingly, in some embodiments, if the target programming language or computing environment does not enforce type safety, entity engines may generate validators for each entity property. Accordingly, in some embodiments, the application programmer or the entity engine itself may employ the validators to validate that the provided entity values are the correct type.

In some embodiments, the native environment or programming language may inherently provide type enforcement (e.g., Go, C++, or the like). If so, the entity engine may omit the generation of property validators. Note, entity engine validators may be considered limited to enforcing data types (including null/not-null rules) for entity properties while the application itself may provide other instructions/code for validating business rules, or the like.

Note, this block is indicated as being optional because in some cases validators may not be required. For example, if the native language does not inherently enforce type-safety, or the like, entity engines may be arranged to generate additional validators to validate that properties values are consistent with the entity type or native type of a given property.

At block 1214, in one or more of the various embodiments, entity engines may be arranged to instantiate the entity as a native object for the calling application. As described above, applications may require native objects that represent entities. Accordingly, in some embodiments, entity engines may be arranged to instantiate native objects to represent the entities in the application environment. Accordingly, in some embodiments, entity engines may be arranged to generate or employ native object definitions that correspond to entities. Thus, in some embodiments, entity engines may be arranged to instantiate the native objects based on the generated object definitions.

Next, in one or more of the various embodiments, control may be returned to a calling process.

Figure 13:
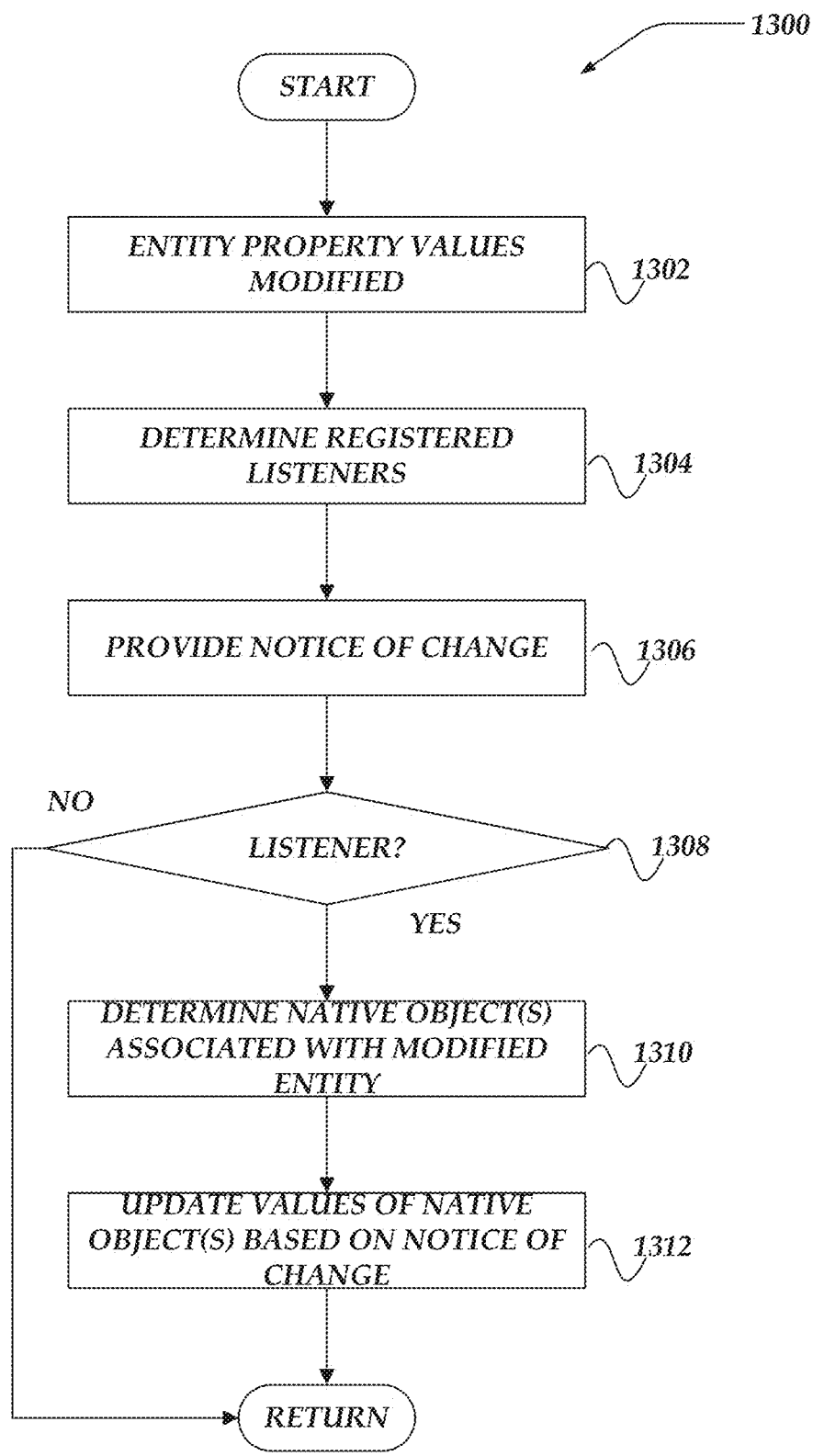
FIG. 13 illustrates a flowchart of a process for entity relationships and versioning in accordance with one or more of the various embodiments.

FIG. 13 illustrates a flowchart of process 1300 for entity relationships and versioning in accordance with one or more of the various embodiments. After a start block, at block 1302, in one or more of the various embodiments, entity engines may be arranged to modify one or more property values of an entity. In some embodiments, one or more applications may be working with native instantiation of entities. Accordingly, in some embodiments, if an application changes a value of an entity property, it will notify the entity engine. Thus, in some embodiments, the entity engine may be arranged to commit the change to the data store and propagate information about the changes to other applications that may depend on the same entities. For example, if a patient user use an application on their mobile phone to cancel an in-person visit, the entity engine may ensure that other applications, such as a practice management portal for a provider organization may be reflect the canceled in-person visit.

At block 1304, in one or more of the various embodiments, entity engines may be arranged to determine one or more applications that may be registered to be notified of changes that may be made to the entity. In one or more of the various embodiments, applications may be enabled to employ interfaces provided by entity engines to obtain native object instantiation of entities. In some embodiments, entity engines may be arranged to automatically monitored with entities an application may be using to establish a registry that indicates which applications may be interested in which entities. Also, in some embodiments, entity engines may be arranged to provide an interface that enables applications to signal that they may be registered to receive information about some particular entities while being uninterested in others. For example, in some embodiments, an application may be arranged to view patient demographic information (e.g., name, age, address, or the like) to enable administrators or patients to update or confirm such information. Accordingly, in this example, the application would have no concern about changes to in-person visits because the application may be limited to view/confirming patient demographic information and prevented from 'seeing' visit information. Thus, in this example, the application may request to be excluded from notifications associated with visits, or the like.

At block 1306, in one or more of the various embodiments, entity engines may be arranged to provide a notification related to the changes. In some embodiments, this may include broadcasting the notification into a message queue or other reliable distributed messaging system.

In some embodiments, entities of the same or different versions may be distributed across multiple applications or multiple users/customers (e.g., multi-tenant deployments). Accordingly, in some embodiments, there may be one or more other applications that may be needed to made aware that one or more properties for one or more entities may have been changed.

Accordingly, in some embodiments, entity engines may be arranged to generate notification messages that may be shared with other applications. In some embodiments, entity engines may be arranged to maintain a registry of which applications may be dependent on particular entity instances. Accordingly, in some embodiments, entity engines may be arranged to determine which applications may require notice of the changes based on this registry.

In one or more of the various embodiments, the notification message may include the actual changes such that if a notice may be received the notification may include data changes such that the receiving application may not have to make a subsequent request to obtain the changed data.

In some embodiments, entity engines may be arranged to distribute change notices using a message queue. Accordingly, in some embodiments, applications that may be interested in being notified may be registered with their local message queue endpoint to be notified of messages associated with particular entities. Accordingly, in some embodiments, if such a notification may be provided, the applications may determine the updated data from the message queue.

At decision block 1308, in one or more of the various embodiments, if an application may be determined to be listening for the provided notification, control may flow to block 1310; otherwise, control may be returned to a calling process.

At block 1310, in one or more of the various embodiments, entity engines may be arranged to push updates to the native objects corresponding to the updated entity based on the notice of change. In some embodiments, the notification may include at least the identifiers associated with the changed entities. In some embodiments, the notification may include a copy of affected entities. Accordingly, in some embodiments, the application may determine which native object may correspond to the entities mentioned in the notification. In some embodiments, entity engines may be arranged to maintain a local map data structure that may provide a reverse index that may associate native object instances with their corresponding entities based on the entity identifiers and a local reference or pointer to the native objects.

Next, in one or more of the various embodiments, control may be returned to a calling process.

Figure 14:
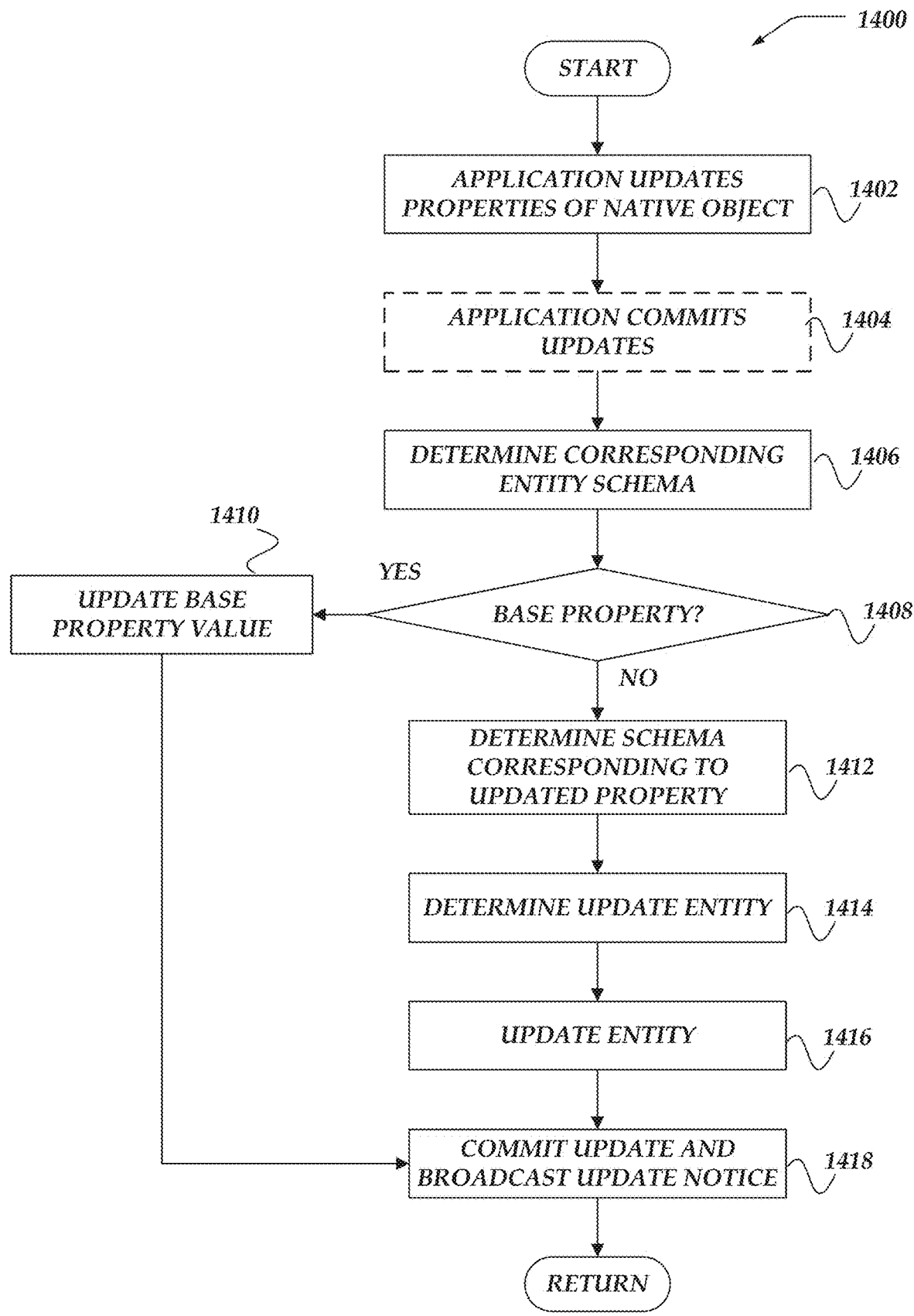
FIG. 14 illustrates a flowchart of a process for entity relationships and versioning in accordance with one or more of the various embodiments.

FIG. 14 illustrates a flowchart of process 1400 for entity relationships and versioning in accordance with one or more of the various embodiments. After a start block, at block 1402, in one or more of the various embodiments, one or more applications may update one or more properties values via a native object. As described above, in some embodiments, applications may be configured to employ native objects that may represent the entities. Accordingly, in some embodiments, applications may be enabled to effect changes to entities via the native objects instantiated based on entities. For example, in some embodiments, if an application is a Java application, the native objects corresponding to entities may be Java objects. Accordingly, in this example, applications may execute java instructions to modify the native objects within the application.

At block 1404, in one or more of the various embodiments, optionally, the applications may be arranged to commit the changes to the system. In some embodiments, entity engines may be arranged to provide interfaces that enable applications to expressly commit the changes that were made to native object instances of entities. For example, in some embodiments, an application may be enabled to make one or more value changes to native objects and then submit the relevant entity identifier(s) to the entity engine to commit the value changes.

In some embodiments, entity engines may be arranged to provide a commit interface that initiates a traversal of the graph of entities that may descend from a top level entity to iteratively or recursively commit all effected entities in the graph. For example, in some embodiments, if an application makes changes to property values of a child entity, committing the parent entity may result in the changes to property values of the child entity being committed.

Note, this block is marked as option because in some cases committing changes may be automatic in the sense that if the application completes the change in values it may be assumed to be committing the changes rather than requiring an explicit independent or otherwise separate commit action.

At block 1406, in one or more of the various embodiments, entity engines may be arranged to determine corresponding entity schema. As described above, in some embodiments, each entity version may have a corresponding schema. Accordingly, in some embodiments, entity engines may be arranged to determine the relevant schema based on the entity type and entity version associated with the entity or entities being committed. As described above, in some embodiments, base properties or common properties of entities may include a type property and a version property. Thus, in some embodiments, if an entity (or native object version of an entity) is provided, entity engines may obtain the entity type and entity version. Accordingly, in some embodiments, entity engines may be arranged to provide indexes or other lookup facilities that enable entity engines to obtain entity schema based on the entity type and entity version.

At decision block 1408, in one or more of the various embodiments, if the property may be a base property, control may flow to block 1410; otherwise, control may flow to block 1412.

As described above, in some embodiments, property values that are stored directly in the entity data table may be considered base properties. In some embodiments, base properties may be properties with relationship to the entity that are not represented in the entity relationship table. For example, in some embodiments, a property for storing a patient age (e.g., an integer) may be considered a base property because its value it not an entity.

Accordingly, in some embodiments, entity engines may be arranged to traverse the schema to determine if the changed property values (subject to the commit operation) may be associated with base properties.

Alternatively, in some embodiments, if the changed property values are actually properties of another entity (e.g., foreign entity), the changed properties may not be considered base properties.

At block 1410, in one or more of the various embodiments, entity engines may be arranged to update the value of the base property. In some embodiments, entity engines may be arranged to determine one or more data store instructions for storing the updated values for the base properties. For example, in some embodiments, if the data store may be a relational database, entity engine may execute an update SQL statement to save the data changes to the database.

Next, control may flow to block 1418.

At block 1412, in one or more of the various embodiments, entity engines may be arranged to determine the entity schema that corresponds to the updated property. Since the updated property is another entity the entity engine may be arranged to determine the schema for the entity being updated. Accordingly, in some embodiments, entity engines may be arranged to traverse the schema of the parent entity to determine the entity type and entity version of the child entity.

At block 1414, in one or more of the various embodiments, entity engines may be arranged to determine the entity that requires updating based on the schema. As described above, in some embodiments, entity engines may be arranged to declare entity relationships in schemas and implement or realized these relationships using entity relationship tables. Accordingly, in some embodiments, entity engines may be arranged to determine the identifier of the parent entity instance via its identifier property. Likewise, in some embodiments, entity engines may be arranged to determine the identifier of the child entity from the entity relationship table.

For example, referring to FIG. 6, if a new televisit record is being added for the patient with 10001 as its identifier, entity engines may be arranged to insert a new record in entity relationship table 612 that would look similar to record 620 except the identifier for the child entity (the new televisit) would be different.

For example, referring to FIG. 6, if the committed property value change included an update to an existing televisit, entity engines may be arranged to update the televisit directly based on its identifier that would be determined based on the parent entity.

At block 1416, in one or more of the various embodiments, entity engines may be arranged to update the entity property based on the application updates.

As herein, in some embodiments, entity engines may generate specialized instructions for executing various data actions on the entity data tables. Thus, in some embodiments, entity engines may determine the particular instructions that may be associated with the entity being updated to execute the update. Note, one of ordinary skill in the art will appreciate that the term update is being used broadly and should be interpreted to encompass other similar database operations, such as, deletes, creates, updates, inserts, or the like.

At block 1418, in one or more of the various embodiments, entity system may be arranged to commit the updates to the data store and broadcast an update notice.

In this context, for some embodiments, committing the updates may include executing one or more particular instructions in the data store or database. For example, in some embodiments, if the data store may support SQL statements, the entity engine may be arranged perform updates within the scope of a SQL transaction, or the like, such that committing the update involves executing a SQL COMMIT statement that commits the changes to the data tables in the data store.

Next, in one or more of the various embodiments, control may be returned to a calling process.

Figure 15:
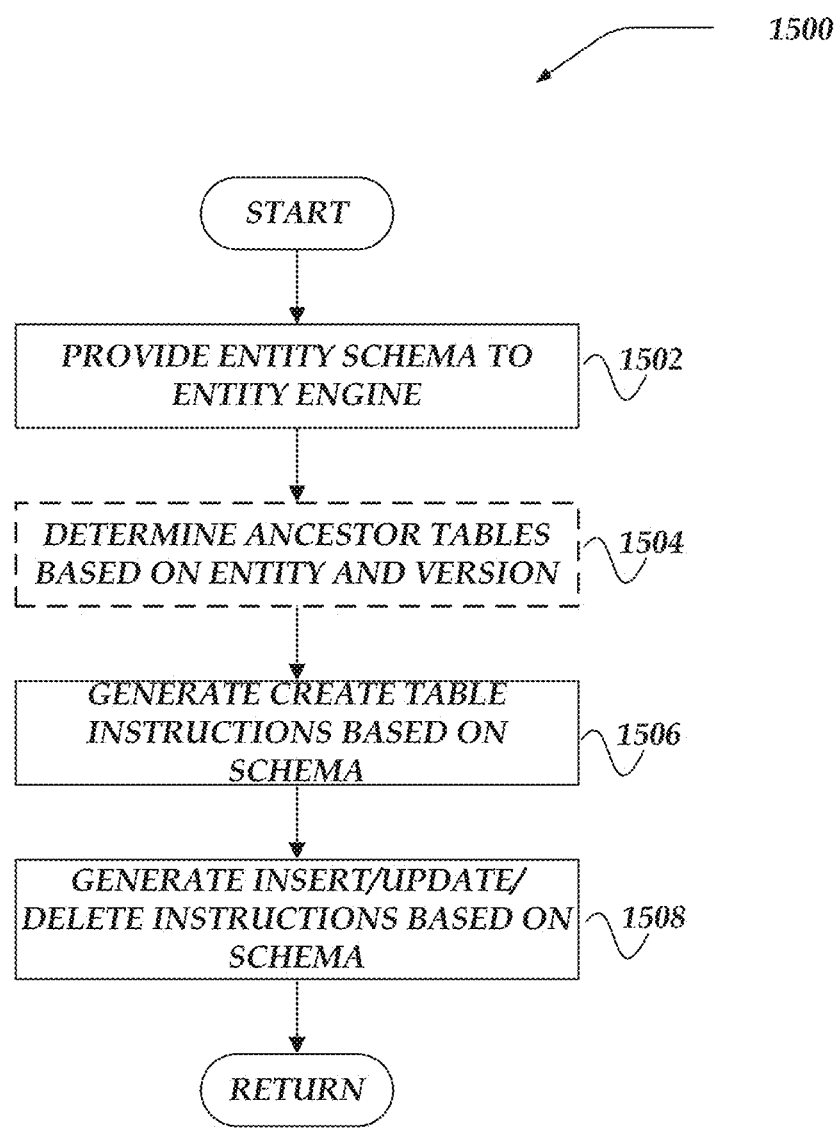
FIG. 15 illustrates a flowchart of a process for entity relationships and versioning in accordance with one or more of the various embodiments.

FIG. 15 illustrates a flowchart of process 1500 for entity relationships and versioning in accordance with one or more of the various embodiments. After a start block, at block 1502, in one or more of the various embodiments, an entity schema may be provided to an entity engine. In one or more of the various embodiments, entity engines may be arranged to provide one or more mechanisms for modifying existing entity schemas or creating new schemas. In some embodiments, entity engines may be arranged to provide one or more user interfaces that enable users to interactively design entities or entity schemas. Also, in some embodiments, entity engines may be arranged to enable users to provide text files that include schemas.

In one or more of the various embodiments, entity engines may be arranged to monitor if changed or new schemas are submitted. In some embodiments, entity engines may apply source-control principles such that incremental changes to schema may be recorded such that a historical record of changes may be preserved. In some embodiments, each schema change may be associated with attribution information that may record information about the changes, such as, who made the change, who committed the change, status of the change, time/date of the change, or the like.

At block 1504, in one or more of the various embodiments, optionally, entity engines may be arranged to determine one or more ancestor data tables based on the schema and version of the schema. As described above, entity engines may be arranged to rely on conventional data stores to provide the back-end data storage for storing data corresponding to entities. In some embodiments, the data store may support data object (e.g., table) inheritance such that one or more shared properties or attributes may be stored in ancestor tables. For example, a base entity table may be arranged to store values for common entity properties such as entity identifiers, version value, last accessed data/time, or the like. In some embodiments, the particular properties or attributes stored in a base table may vary depending on local circumstances or local requirements. Accordingly, in some embodiments, entity engines may be arranged to determine base table fields based on instructions, or the like, provided via configuration information or the schema files themselves.

Note, this block is indicated as being optional because in some cases the underlying data store may omit the use of inherited or inheritable tables.

At block 1506, in one or more of the various embodiments, entity engines may be arranged to generate one or more create/alter instructions that may be directed to providing a data store table for storing the modified entity. In one or more of the various embodiments, entity engines that determine that the provided schema is for a new entity may be arranged to generate database instruction that may be execute in the context of the data store (e.g., database server) to generate one or more tables for the entity. Accordingly, in some embodiments, entity engines may be arranged to traverse the schema to determine which properties (e.g., concrete types) should be included in the entity main table and which properties may establish relationships with one or more other entities.

In some embodiments, properties that establish relationships to other entities may be excluded from the entity data table because entity engines may be arranged to enforce relationships between entities using an entity relationship table. Accordingly, in some embodiments, some changes to schemas may not result in a new table or modified table rather the changes may result in establishing entity relationships using the entity relationship table.

At block 1508, in one or more of the various embodiments, entity engines may be arranged to generate one or more insert/update/delete instructions for the entity based on the schema. In some embodiments, entity engines may be arranged to generate one or more instructions for working with or administering entity data tables. For example, in some embodiments, if a value of an entity property is changed, the backing data store may be required to execute one or more update operations or insert operations to commit the data changes.

In one or more of the various embodiments, entity engines may be arranged to generate these data table support instructions to be compatible with the underlying data store (e.g., data server). Accordingly, in some embodiments, different instructions may be generated depending on the particular target data store. Accordingly, in some embodiments, entity engines may be arranged to determine which instructions, templates, or the like, to employ based on configuration information. For example, in some embodiments, configuration information may include a map of entity data actions to instructions, templates, code generators, or the like, that may be execute in the particular database to effect any necessary changes or updates.

Accordingly, in some embodiments, if applications update entity property values, entity engines may be arranged to employ these generated instructions to execute the changes within the data store.

Next, in one or more of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a computing environment using one or more processors to execute instructions that are configured to cause actions, comprising:
   providing a request from an application to instantiate an entity, wherein the request includes an entity version;
   determining a schema that corresponds to the entity based on the entity version;

determining one or more foreign properties of the entity based on a traversal of the schema, wherein each foreign property includes a foreign entity type and a foreign entity version;

determining one or more relationships between the entity and one or more foreign entities based on an entity relationship table that is separate from the schema, wherein each relationship associates one or more foreign entity identifiers with the one or more foreign properties;

generating a native object for a native environment of the application based on the schema, the entity and the one or more foreign entities, wherein the native object includes one or more members that correspond to the one or more foreign entities;

providing data associated with the entity and the one or more foreign entities to the application based on the native object;

employing changes to the data by one or more other applications to update the native object to include the changed data;

in response to the application modifying the data of the native object, performing additional further actions:
  updating the entity and the one or more foreign entities based on the modified data; and
  generating a message that includes the modified data, wherein the message is provided to a message queue; and employing the message queue to provide the other message to the one or more other applications.

2. The method of claim 1, further comprising:
determining one or more foreign entity types based on the schema and the one or more foreign properties;
generating a native object class that is compatible with the native environment of the application based on the schema and the one or more foreign entity types, wherein the native object class declares the one or more members that correspond to the one or more foreign entities; and
employing the native object class to instantiate the native object.

3. The method of claim 1, wherein determining the one or more relationships between the entity and the one or more foreign entities, further comprises:
determining one or more relationship records from the entity relationship table based on an identifier that corresponds to the entity, wherein each relationship record declares that the entity is a parent of the one or more foreign entities, wherein each relationship record declares a foreign entity that is a child of the entity.

4. The method of claim 1, further comprising:
generating one or more validators that are compatible with the native environment of the application, wherein each validator corresponds to a foreign entity; and
in response to the application modifying the native object, validating the modification based on the one or more validators.

5. The method of claim 1, further comprising:
registering the application to detect one or more messages associated with one or more modifications to the entity or the one or more foreign entities, wherein the one or more modifications are performed by the one or more other applications.

6. The method of claim 1, further comprising:
determining one or more base properties of the entity based on the traversal of the schema, wherein each base property corresponds to a concrete value associated with the entity.

7. A network computer for managing data over a network, comprising:
a memory that stores at least instructions; and
one or more processors that execute instructions that are configured to cause actions, including:
  providing a request from an application to instantiate an entity, wherein the request includes an entity version;
  determining a schema that corresponds to the entity based on the entity version;
  determining one or more foreign properties of the entity based on a traversal of the schema, wherein each foreign property includes a foreign entity type and a foreign entity version;
  determining one or more relationships between the entity and one or more foreign entities based on an entity relationship table that is separate from the schema, wherein each relationship associates one or more foreign entity identifiers with the one or more foreign properties;
  generating a native object for a native environment of the application based on the schema, the entity and the one or more foreign entities, wherein the native object includes one or more members that correspond to the one or more foreign entities;
  providing data associated with the entity and the one or more foreign entities to the application based on the native object;
  employing changes to the data by one or more other applications to update the native object to include the changed data;
  in response to the application modifying the data of the native object, performing additional further actions:
    updating the entity and the one or more foreign entities based on the modified data; and
    generating a message that includes the modified data, wherein the message is provided to a message queue; and
  employing the message queue to provide the other message to the one or more other applications.

8. The network computer of claim 7, wherein the one or more processors execute instructions that are configured to cause actions, further comprising:
determining one or more foreign entity types based on the schema and the one or more foreign properties;
generating a native object class that is compatible with the native environment of the application based on the schema and the one or more foreign entity types, wherein the native object class declares the one or more members that correspond to the one or more foreign entities; and
employing the native object class to instantiate the native object.

9. The network computer of claim 7, wherein determining the one or more relationships between the entity and the one or more foreign entities, further comprises:
determining one or more relationship records from the entity relationship table based on an identifier that corresponds to the entity, wherein each relationship record declares that the entity is a parent of the one or more foreign entities, wherein each relationship record declares a foreign entity that is a child of the entity.

10. The network computer of claim 7, wherein the one or more processors execute instructions that are configured to cause actions, further comprising:
generating one or more validators that are compatible with the native environment of the application, wherein each validator corresponds to a foreign entity; and
in response to the application modifying the native object, validating the modification based on the one or more validators.

11. The network computer of claim 7, wherein the one or more processors execute instructions that are configured to cause actions, further comprising:
registering the application to detect one or more messages associated with one or more modifications to the entity or the one or more foreign entities, wherein the one or more modifications are performed by the one or more other applications.

12. The network computer of claim 7, wherein the one or more processors execute instructions that are configured to cause actions, further comprising:
determining one or more base properties of the entity based on the traversal of the schema, wherein each base property corresponds to a concrete value associated with the entity.

13. A processor readable non-transitory storage media that includes instructions configured for managing data in a computing environment, wherein execution of the instructions by one or more processors on one or more network computers performs actions, comprising:
providing a request from an application to instantiate an entity, wherein the request includes an entity version;
determining a schema that corresponds to the entity based on the entity version;
determining one or more foreign properties of the entity based on a traversal of the schema, wherein each foreign property includes a foreign entity type and a foreign entity version;
determining one or more relationships between the entity and one or more foreign entities based on an entity relationship table that is separate from the schema, wherein each relationship associates one or more foreign entity identifiers with the one or more foreign properties;
generating a native object for a native environment of the application based on the schema, the entity and the one or more foreign entities, wherein the native object includes one or more members that correspond to the one or more foreign entities;
providing data associated with the entity and the one or more foreign entities to the application based on the native object;
employing changes to the data by one or more other applications to update the native object to include the changed data;
in response to the application modifying the data of the native object, performing additional further actions:
updating the entity and the one or more foreign entities based on the modified data; and
generating a message that includes the modified data, wherein the message is provided to a message queue; and
employing the message queue to provide the other message to the one or more other applications.

14. The media of claim 13, further comprising:
determining one or more foreign entity types based on the schema and the one or more foreign properties;
generating a native object class that is compatible with the native environment of the application based on the schema and the one or more foreign entity types, wherein the native object class declares the one or more members that correspond to the one or more foreign entities; and
employing the native object class to instantiate the native object.

15. The media of claim 13, wherein determining the one or more relationships between the entity and the one or more foreign entities, further comprises:
determining one or more relationship records from the entity relationship table based on an identifier that corresponds to the entity, wherein each relationship record declares that the entity is a parent of the one or more foreign entities, wherein each relationship record declares a foreign entity that is a child of the entity.

16. The media of claim 13, further comprising:
generating one or more validators that are compatible with the native environment of the application, wherein each validator corresponds to a foreign entity; and
in response to the application modifying the native object, validating the modification based on the one or more validators.

17. The media of claim 13, further comprising:
registering the application to detect one or more messages associated with one or more modifications to the entity or the one or more foreign entities, wherein the one or more modifications are performed by the one or more other applications.

18. The media of claim 13, further comprising:
determining one or more base properties of the entity based on the traversal of the schema, wherein each base property corresponds to a concrete value associated with the entity.

19. A system for managing resources over a network, comprising:
a network computer, comprising:
a memory that stores at least instructions; and
one or more processors that execute instructions that are configured to cause actions, including:
providing a request from an application to instantiate an entity, wherein the request includes an entity version;
determining a schema that corresponds to the entity based on the entity version;
determining one or more foreign properties of the entity based on a traversal of the schema, wherein each foreign property includes a foreign entity type and a foreign entity version;
determining one or more relationships between the entity and one or more foreign entities based on an entity relationship table that is separate from the schema, wherein each relationship associates one or more foreign entity identifiers with the one or more foreign properties;
generating a native object for a native environment of the application based on the schema, the entity and the one or more foreign entities, wherein the native object includes one or more members that correspond to the one or more foreign entities;
providing data associated with the entity and the one or more foreign entities to the application based on the native object;
employing changes to the data by one or more other applications to update the native object to include the changed data;

in response to the application modifying the data of the native object, performing additional further actions:
 updating the entity and the one or more foreign entities based on the modified data; and
 generating a message that includes the modified data, wherein the message is provided to a message queue; and
 employing the message queue to provide the other message to the one or more other applications; and
one or more other network computers, comprising:
 a memory that stores at least instructions; and
 one or more processors that execute instructions that are configured to cause actions, including:
 hosting the application.

20. The system of claim 19, wherein the one or more processors of the one or more network computers execute instructions that are configured to cause actions, further comprising:
 determining one or more foreign entity types based on the schema and the one or more foreign properties;
 generating a native object class that is compatible with the native environment of the application based on the schema and the one or more foreign entity types, wherein the native object class declares the one or more members that correspond to the one or more foreign entities; and
 employing the native object class to instantiate the native object.

21. The system of claim 19, wherein determining the one or more relationships between the entity and the one or more foreign entities, further comprises:
 determining one or more relationship records from the entity relationship table based on an identifier that corresponds to the entity, wherein each relationship record declares that the entity is a parent of the one or more foreign entities, wherein each relationship record declares a foreign entity that is a child of the entity.

22. The system of claim 19, wherein the one or more processors of the one or more network computers execute instructions that are configured to cause actions, further comprising:
 generating one or more validators that are compatible with the native environment of the application, wherein each validator corresponds to a foreign entity; and
 in response to the application modifying the native object, validating the modification based on the one or more validators.

23. The system of claim 19, wherein the one or more processors of the one or more network computers execute instructions that are configured to cause actions, further comprising:
 registering the application to detect one or more messages associated with one or more modifications to the entity or the one or more foreign entities, wherein the one or more modifications are performed by the one or more other applications.

24. The system of claim 19, wherein the one or more processors of the one or more network computers execute instructions that are configured to cause actions, further comprising:
 determining one or more base properties of the entity based on the traversal of the schema, wherein each base property corresponds to a concrete value associated with the entity.

* * * * *